US 8,197,316 B2
Jun. 12, 2012

(12) United States Patent
Marcus

(10) Patent No.: US 8,197,316 B2
(45) Date of Patent: *Jun. 12, 2012

(54) SYSTEMS AND USER INTERACTIVE SCREENS FOR ESTIMATING EVENTS OR CONDITIONS

(75) Inventor: Michael B. Marcus, Chicago, IL (US)

(73) Assignee: Bunge Limited, White Plains, NY (US)

(*) Notice: Subject to any disclaimer, the term of this patent is extended or adjusted under 35 U.S.C. 154(b) by 1010 days.

This patent is subject to a terminal disclaimer.

(21) Appl. No.: 11/749,376

(22) Filed: May 16, 2007

(65) Prior Publication Data
US 2007/0281769 A1 Dec. 6, 2007

Related U.S. Application Data

(60) Provisional application No. 60/747,504, filed on May 17, 2006.

(51) Int. Cl.
A63F 9/24 (2006.01)

(52) U.S. Cl. .................. 463/9; 463/10; 463/20; 705/14; 705/37

(58) Field of Classification Search ............... 463/9, 10, 463/42, 40, 43, 20; 705/14, 37
See application file for complete search history.

(56) References Cited

U.S. PATENT DOCUMENTS

| 4,588,192 | A  | * | 5/1986  | Laborde ................... 273/240 |
| 5,689,418 | A  |   | 11/1997 | Monson |
| 6,232,974 | B1 | * | 5/2001  | Horvitz et al. ............. 345/419 |
| 6,390,472 | B1 | * | 5/2002  | Vinarsky ................... 273/278 |
| 6,865,542 | B2 |   | 3/2005  | Cox et al. |
| 2002/0059091 | A1 |   | 5/2002  | Hay et al. |
| 2002/0198761 | A1 |   | 12/2002 | Ryan et al. |
| 2003/0149611 | A1 |   | 8/2003  | Wong |
| 2003/0167146 | A1 | * | 9/2003  | Tezuka et al. .............. 702/129 |
| 2004/0128224 | A1 | * | 7/2004  | Dabney et al. .............. 705/37 |
| 2004/0133463 | A1 |   | 7/2004  | Benderev |
| 2005/0027572 | A1 |   | 2/2005  | Goshert |
| 2005/0108027 | A1 |   | 5/2005  | Horger |
| 2005/0165635 | A1 |   | 7/2005  | Moessner |
| 2005/0177412 | A1 |   | 8/2005  | Kemp |
| 2005/0197884 | A1 |   | 9/2005  | Mullen |
| 2005/0240466 | A1 |   | 10/2005 | Duggirala |
| 2005/0240505 | A1 | * | 10/2005 | Brightbill .................. 705/37 |
| 2005/0246218 | A1 |   | 11/2005 | Benson |
| 2005/0278241 | A1 | * | 12/2005 | Reader ...................... 705/37 |
| 2006/0010136 | A1 | * | 1/2006  | Deangelo ................... 707/10 |
| 2006/0015374 | A1 |   | 1/2006  | Ochs et al. |
| 2006/0036462 | A1 |   | 2/2006  | King et al. |
| 2006/0053058 | A1 |   | 3/2006  | Hotchkiss et al. |
| 2006/0206240 | A1 | * | 9/2006  | Tsui ........................ 700/291 |

OTHER PUBLICATIONS

Website IEM Iowa Electronic Markets, Can Markets Predict the Future?, www.biz.uiowa.edu/iem/index.html, 2 pages.

(Continued)

Primary Examiner — Dmitry Suhol
Assistant Examiner — Brandon Gray
(74) Attorney, Agent, or Firm — Cook Alex Ltd.

(57) ABSTRACT

The systems generate and provide user interactive screens which include contest grids for each sub-contest, with the grids having a second row of spaces for entry of multiple estimations of an event or a condition, a third row of spaces for entry of points per estimation, and a first row of spaces that indicates if any estimation matches historical data. Contest points may be partially or completely allocated between sub-contests in sub-contest fields. The user may select a state and county applicable to the contest. Distribution options of uniform, triangular (peaked), increasing or decreasing may be selected for the points per estimation. The user interactive screens are useful for estimating future agricultural crop events or conditions.

23 Claims, 29 Drawing Sheets

OTHER PUBLICATIONS

Website Hollywood Stock Exchange. Welcome to the Hollywood Stock Exchange—The Entertainment Prediction Market. 2 pages.

PCT International Preliminary Report on Patentability Dec. 11, 2008.
International Search Report, Oct. 7, 2008.

* cited by examiner

FIG. 2A

PREDICTION MARKET — 40

| HOME PAGE | COUNTY CONTEST | CHANGE MY COUNTY | RULES AND PRIVACY POLICY | MY PREDICTIONS | MY ACCOUNT | MY PROFILE | CATALOG | LOG OFF |

WELCOME (BPM 2006)

TAKE A TOUR

ADAMS, IOWA — 42

CHANGE STATE/COUNTY — 43
(ONLY FOR FIRST PREDICTION OF WEEK)

ANNOUNCE
- HEY
- TEST ANNOUN
- PARTICIPANT
- THIS IS THE HE
- ABO +
- ONE MORE ANNO
- HE

— 41

START: WED MAY 24 2006 12:01:00AM CST — 45
END: TUE MAY 30 2006 11:59:00PM CST — 46
21 HOURS REMAINING — 47

POINTS ⓘ  PREDICTION DETAILS ⓘ

CORN
PLANTED
PRED POINTS
HISTORY YEAR ⓘ : 2002, 05
PREDICTION (ACRES) ⓘ [-][+] : 56,000
POINTS PER PREDICTION: [ ]
POINTS DISTRIBUTION OPTIONS: ↑ UNIFORM  △ TRIANGULAR  ↘ DECREASING  ↗ INCREASING

SOYBEANS
PLANTED
PRED POINTS
HISTORY YEAR ⓘ : 2005
PREDICTION (ACRES) ⓘ [-][+] : 61,000
POINTS PER PREDICTION: [ ]
POINTS DISTRIBUTION OPTIONS: ↑ UNIFORM  △ TRIANGULAR  ↘ DECREASING  ↗ INCREASING

[SUBMIT]

1000 UNUSED ⓘ
1,000 MAXIMUM ALLOCATED POINTS ⓘ

ANNUAL HISTORY | AWARD ⓘ
HISTORY

TOTAL OF 1,001,700
REWARD POINTS TO
WINNER(S) OF ALL
CONTESTS OR SUB-
CONTESTS
NATIONWIDE.

HISTORY

FIG. 2B

PREDICTION MARKET — 50

| HOME PAGE | COUNTY CONTEST | CHANGE MY COUNTY | RULES AND PRIVACY POLICY | MY PREDICTIONS | MY ACCOUNT | MY PROFILE | CATALOG | LOG OFF |

WELCOME — 44    (8PM 2006)

YOUR CURRENT COUNTY IS: ADAMS, IOWA — 42

START — 45    END — 46
WED MAY 24 2006 12:01:00AM CST    TUE MAY 30 2006 11:59:00PM CST

47 — 20 HOURS REMAINING

SELECT A STATE: IOWA — 51

— 53
— 52

| COUNTY | ACTIVE CONTEST |
|---|---|
| ○ ADAIR | CORN PLANTED, SOYBEANS PLANTED |
| ○ ADAMS | CORN PLANTED, SOYBEANS PLANTED |
| ○ ALLAMAKEE | CORN PLANTED, SOYBEANS PLANTED |
| ○ APPANOOSE | CORN PLANTED, SOYBEANS PLANTED |
| ○ AUDUBON | CORN PLANTED, SOYBEANS PLANTED |
| ○ BENTON | CORN PLANTED, SOYBEANS PLANTED |
| ○ BLACK HAWK | CORN PLANTED, SOYBEANS PLANTED |
| ○ BOONE | CORN PLANTED, SOYBEANS PLANTED |
| ○ BREMER | CORN PLANTED, SOYBEANS PLANTED |
| ○ BUCHANAN | CORN PLANTED, SOYBEANS PLANTED |

54

ANNOUNCE
- HEY
- TEST ANNOUN
PARTICIPANT
- THIS IS THE HE
- 80 +
- ONE MORE ANNO
- HEI

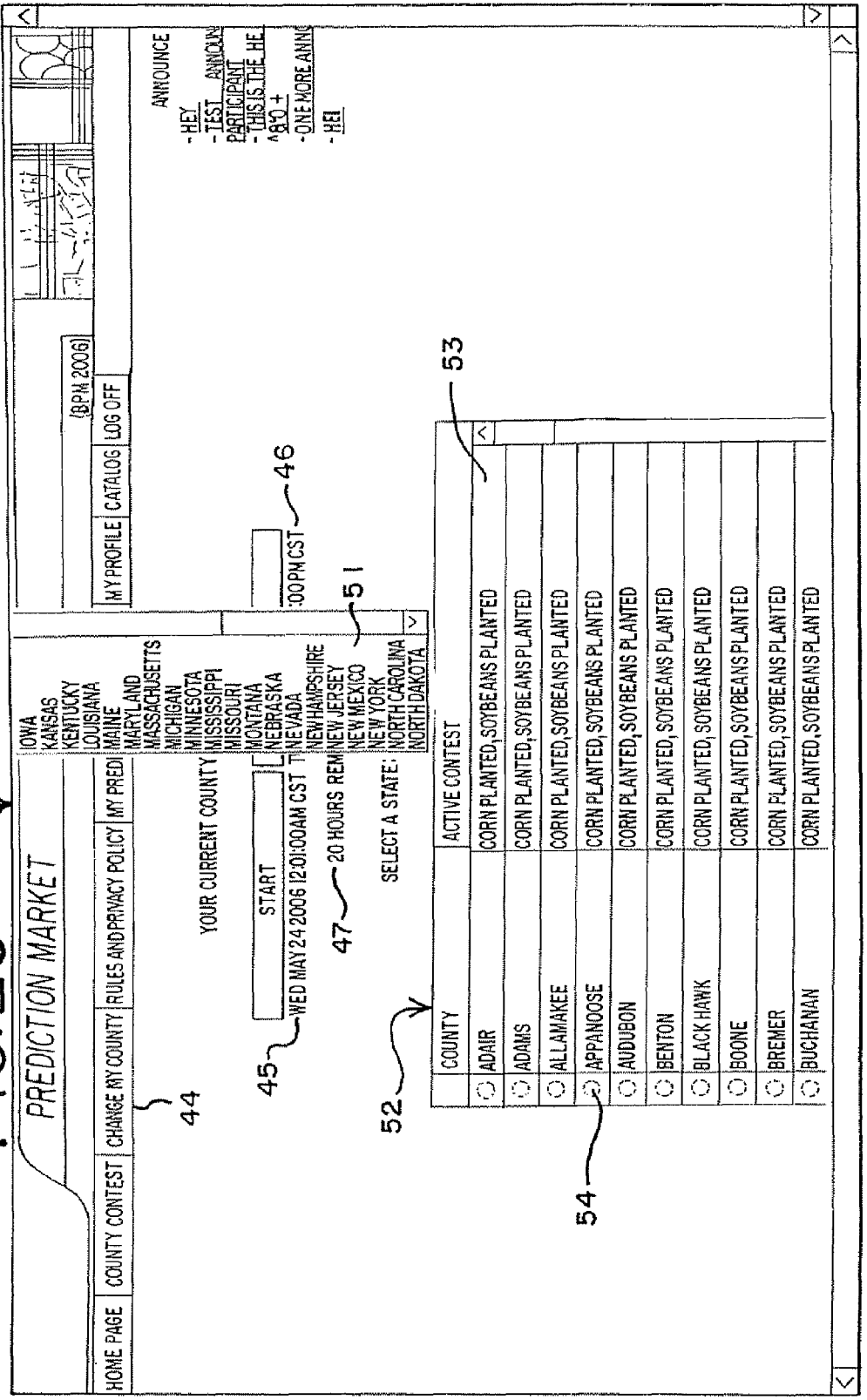

FIG. 2D

PREDICTION MARKET                                                      (3PM 2006)

| HOME PAGE | COUNTY CONTEST | CHANGE MY COUNTY | RULES AND PRIVACY POLICY | MY PREDICTIONS | MY ACCOUNT | MY PROFILE | CATALOG | LOG OFF |

WELCOME.

YOUR CURRENT COUNTY IS: ADAMS, IOWA ~42

START — WED MAY 24 2006 12:01:00AM CST   END — TUE MAY 30 2006 11:59:00PM CST ~46

45~                      47~ 20 HOURS REMAINING

SELECT A STATE: ILLINOIS ~51

~52

| COUNTY | ACTIVE CONTEST |
|---|---|
| ○ ADAMS | CORN YIELD, SOYBEANS PLANTED |
| ○ ALEXANDER | CORN PLANTED, SOYBEANS PLANTED |
| ○ BOND | CORN PLANTED, SOYBEANS PLANTED |
| ○ BOONE | CORN PLANTED, SOYBEANS PLANTED |
| ○ BROWN | CORN PLANTED, SOYBEANS PLANTED |
| ○ BUREAU | CORN PLANTED, SOYBEANS PLANTED |
| ○ CALHOUN | CORN PLANTED, SOYBEANS PLANTED |
| ○ CARROLL | CORN PLANTED, SOYBEANS PLANTED |
| ○ CASS | CORN PLANTED, SOYBEANS PLANTED |
| ○ CHAMPAIGN | CORN PLANTED, SOYBEANS PLANTED |

ANNOUNCE
- HEY
- TEST ANNOU
  PARTICIPANT
- THIS IS THE HE
- 810 +
- ONE MORE ANNO
- HE!

YOUR CURRENT COUNTY IS: ADAMS, IOWA —42

| START | END |
|---|---|
| WED MAY 24 2006 12:01:00AM CST | TUE MAY 30 2006 11:59:00PM CST —46 |

45

47— 20 HOURS REMAINING

SELECT A STATE: ILLINOIS ⌄ — 51

| COUNTY | ACTIVE CONTEST |
|---|---|
| ○ DOUGLAS | CORN PLANTED, SOYBEANS PLANTED |
| ○ DUPAGE | CORN PLANTED, SOYBEANS PLANTED |
| ○ EDGAR | CORN PLANTED, SOYBEANS PLANTED |
| ○ EDWARDS | CORN PLANTED, SOYBEANS PLANTED |
| ⊙ EFFINGHAM | CORN PLANTED, SOYBEANS PLANTED |
| ○ FAYETTE | CORN PLANTED, SOYBEANS PLANTED |
| ○ FORD | CORN PLANTED, SOYBEANS PLANTED |
| ○ FRANKLIN | CORN PLANTED, SOYBEANS PLANTED |
| ○ FULTON | CORN PLANTED, SOYBEANS PLANTED |
| ○ GALLATIN | CORN PLANTED, SOYBEANS PLANTED |
| ○ GREENE | CORN PLANTED, SOYBEANS PLANTED |
| ○ GRUNDY | CORN PLANTED, SOYBEANS PLANTED |
| ○ HAMILTON | CORN PLANTED, SOYBEANS PLANTED |
| ○ HANCOCK | CORN PLANTED, SOYBEANS PLANTED |

[SUBMIT] [CANCEL]

52

54

80

ANNOUNCE
- HEY
- TEST ANNOUN
PARTICIPANT
- THIS IS THE HE
- 890 +
- ONE MORE ANNO
- HEI

FIG. 2F

PREDICTION MARKET — 90

| HOME PAGE | COUNTY CONTEST | CHANGE MY COUNTY | RULES AND PRIVACY POLICY | MY PREDICTIONS | MY ACCOUNT | MY PROFILE | CATALOG | LOG OFF |

WELCOME (BPM 2006)

TAKE A TOUR

EFFINGHAM, ILLINOIS — 42

44

45 — START: WED MAY 24 2006 12:01:00AM CST    END: TUE MAY 30 2006 11:59:00 PM CST — 46

20 HOURS REMAINING

CHANGE STATE/COUNTY (?)
(ONLY FOR FIRST PREDICTION OF WEEK)

ANNOUNCE
- HEY
- TEST ANNOUN
- THIS IS THE HE
PARTICIPANT
- A 8 0 +
- ONE MORE ANNO
- HE

POINTS (?) PREDICTION DETAILS (?)  — 91

CORN
PLANTED
PRED POINTS — 93, 92
HISTORY YEAR (?): 2004, 05
PREDICTION (ACRES) (?): 95,000
POINTS PER PREDICTION
POINTS DISTRIBUTION OPTIONS: ↑ UNIFORM  △ TRIANGULAR  ↓ DECREASING  ↗ INCREASING

SOYBEANS
PLANTED
PRED POINTS
HISTORY YEAR (?): 2005
PREDICTION (ACRES) (?): 98,000
POINTS PER PREDICTION
POINTS DISTRIBUTION OPTIONS: ↑ UNIFORM  △ TRIANGULAR  ↓ DECREASING  ↗ INCREASING

ANNUAL HISTORY/AWARD (?)
HISTORY
HISTORY

94

TOTAL OF 1,001,700 REWARD POINTS TO WINNER(S) OF ALL CONTESTS OR SUB-CONTESTS NATIONWIDE.

SUBMIT

1000 UNUSED (?)
1,000 MAXIMUM ALLOCATED POINTS (?)

PREDICTION MARKET

HOME PAGE | COUNTY CONTEST | CHANGE MY COUNTY | RULES AND PRIVACY POLICY | MY PREDICTIONS | MY ACCOUNT | MY PROFILE | CATALOG | LOG OFF

WELCOME (BPM 2006)

TAKE A TOUR

140

EFFINGHAM, ILLINOIS — 42

CHANGE STATE/COUNTY (?)
(ONLY FOR FIRST PREDICTION OF WEEK)

ANNOUNCE
- HEY
- TEST ANNOUN
- PARTICIPANT
- THIS IS THE HE
- 80 +
- ONE MORE ANNO
- HEL

| START | END |
|---|---|
| WED MAY 24 2006 12:01:00AM CST — 45 | TUE MAY 30 2006 11:59:00PM CST — 46 |

20 HOURS REMAINING

92 — POINTS (?) | PREDICTION DETAILS (?)

CORN PLANTED

131 — HISTORY YEAR (?) — 132

| | 2004,05 | | 2004 | | 2005 | | 2002 | | | | | | | | |
|---|---|---|---|---|---|---|---|---|---|---|---|---|---|---|---|
| 95,000 | ▽ | 96,000 | 97,000 | 98,000 | 99,000 | 100,000 | 101,000 | 102,000 | 103,000 | 104,000 | 105,000 |

PREDICTION (ACRES) (?) — 133 134

POINTS PER PREDICTION

| 600 | 54 | 54 | 54 | 54 | 54 | 55 | 55 | 55 | 55 | 55 | 55 |

105 — 93

POINTS DISTRIBUTION OPTIONS

UNIFORM △ TRIANGULAR ▽ DECREASING ↑ INCREASING

ANNUAL HISTORY | AWARD (?)

HISTORY

SOYBEANS PLANTED

HISTORY YEAR (?)

| | 2005 | | | | | | 2002 | 2001,03 | | | |
|---|---|---|---|---|---|---|---|---|---|---|---|
| 98,000 | ▽ | 99,000 | 100,000 | 101,000 | 102,000 | 103,000 | 104,000 | 105,000 | 106,000 | 107,000 | 108,000 |

PREDICTION (ACRES) (?)

POINTS PER PREDICTION

| 400 | 38 | 38 | 38 | 38 | 38 | 38 | 38 | 37 | 37 | 37 | 37 |

108

POINTS DISTRIBUTION OPTIONS

UNIFORM △ TRIANGULAR ▽ DECREASING ↑ INCREASING

HISTORY

TOTAL OF 1,001,700 REWARD POINTS TO WINNER(S) OF ALL CONTESTS OR SUB-CONTESTS NATIONWIDE.

106 — 0 UNUSED (?) | 1,000 MAXIMUM ALLOCATED POINTS (?)

[SUBMIT]

*Figure shows a Prediction Market web interface screenshot (reference 170) with the following elements:*

Tabs: HOME PAGE | COUNTY CONTEST | CHANGE MY COUNTY | RULES AND PRIVACY POLICY | MY PREDICTIONS | MY ACCOUNT | MY PROFILE | CATALOG | LOG OFF

WELCOME (BPM 2006)

TAKE A TOUR

EFFINGHAM, ILLINOIS — 42

CHANGE STATE/COUNTY (?) (ONLY FOR FIRST PREDICTION OF WEEK)

START: WED MAY 24 2006 12:01:00 AM CST — 45
END: TUE MAY 30 2006 11:59:00 PM CST — 46
20 HOURS REMAINING

ANNOUNCE
- HEY
- TEST ANNOUN
- THIS IS THE HE
- 80 +
- ONE MORE ANNO
- HE

92 — POINTS (?) PREDICTION DETAILS (?)   ANNUAL HISTORY AWARD (?)

CORN PLANTED — 131, 132
PRED POINTS: 600 — 105

| HISTORY YEAR (?) | PREDICTION (ACRES) (?) | POINTS PER PREDICTION | | | | | | | | | | | HISTORY |
|---|---|---|---|---|---|---|---|---|---|---|---|---|---|
| 2004,05 | 95,000 [▽] [−][+] | 100 | 96,000 | 97,000 | 98,000 | 99,000 | 100,000 | 101,000 | 102,000 | 103,000 | 104,000 | 105,000 | |
| | | | 91 | 92 | 73 | 64 | 55 | 45 | 36 | 27 | 18 | 9 | |

93 — POINTS DISTRIBUTION OPTIONS  UNIFORM  TRIANGULAR  DECREASING  INCREASING — 171
101

SOYBEANS PLANTED — 133, 134
PRED POINTS: 400 — 106

| HISTORY YEAR (?) | PREDICTION (ACRES) (?) | POINTS PER PREDICTION | | | | | | | | | | | HISTORY |
|---|---|---|---|---|---|---|---|---|---|---|---|---|---|
| 2005 | 98,000 [▽] [−][+] | 68 | 99,000 | 100,000 | 101,000 | 102,000 | 103,000 | 104,000 | 105,000 | 106,000 | 107,000 | 108,000 | |
| | | | 61 | 55 | 48 | 42 | 36 | 30 | 24 | 18 | 12 | 8 | |

POINTS DISTRIBUTION OPTIONS  UNIFORM  TRIANGULAR  DECREASING  INCREASING — 172
108

[SUBMIT]

0 UNUSED (?)
1,000 MAXIMUM ALLOCATED POINTS (?)

TOTAL OF 1,001,700 REWARD POINTS TO WINNER(S) OF ALL CONTESTS OR SUB-CONTESTS NATIONWIDE.

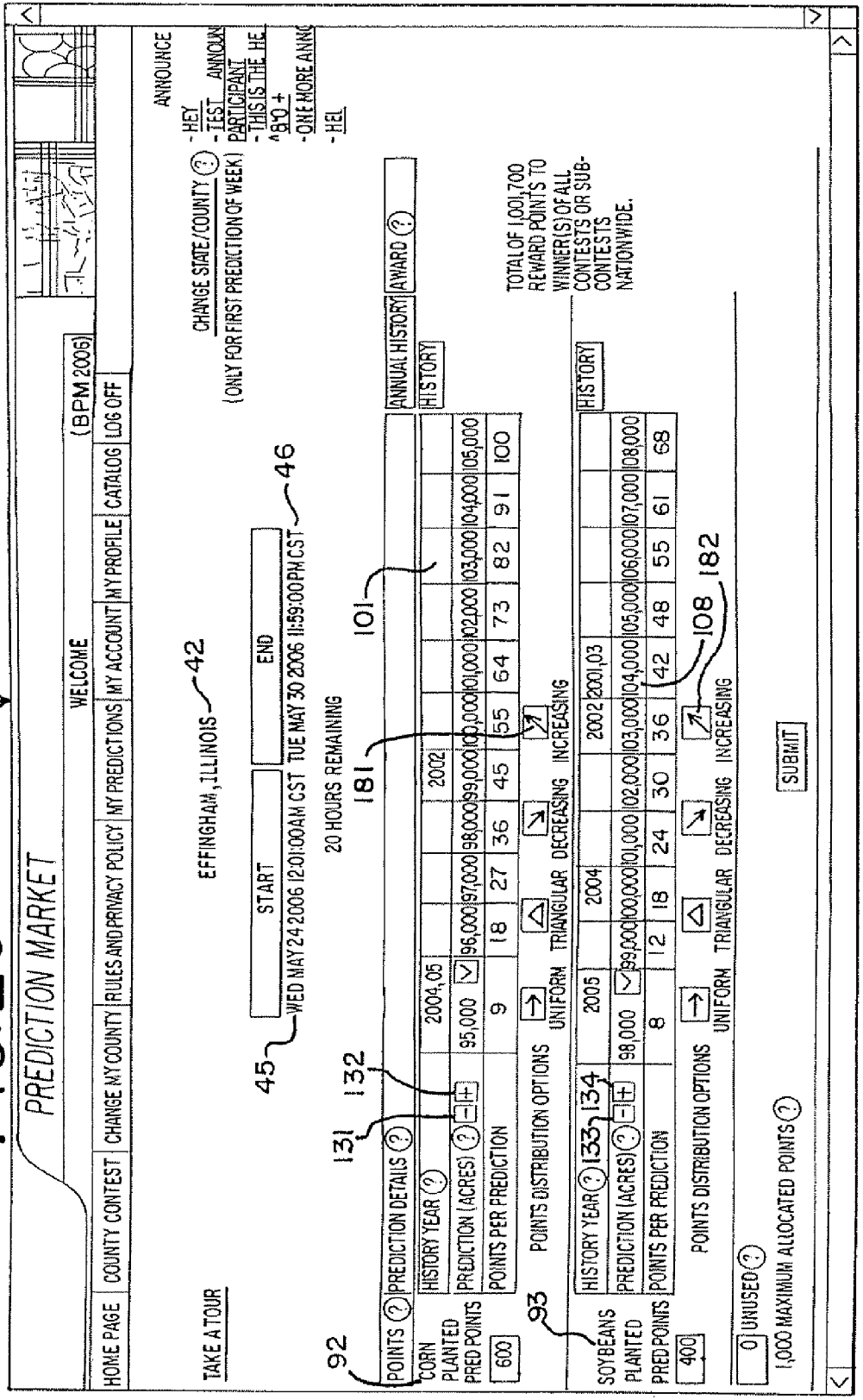

| PREDICTION MARKET | | | | | | | | | | | WELCOME (BPM 2005) | | |
|---|---|---|---|---|---|---|---|---|---|---|---|---|---|
| HOME PAGE | COUNTY CONTEST | CHANGE MY COUNTY | RULES AND PRIVACY POLICY | MY PREDICTIONS | MY ACCOUNT | MY PROFILE | CATALOG | LOG OFF | | | | | |

YOU HAVE NOT MADE ANY CHANGES TO YOUR PREDICTION. HENCE THE PREDICTION WOULD NOT BE SUBMITTED.

TAKE A TOUR  —221    EFFINGHAM, ILLINOIS —42    CHANGE STATE/COUNTY (?)
(ONLY FOR FIRST PREDICTION OF WEEK)

| START | END |
|---|---|
| WED MAY 24 2006 12:01:00AM CST | TUE MAY 30 2006 11:59:00PM CST |

20 HOURS REMAINING

ANNOUNCE
- HEY
- TEST    ANNOUN
  PARTICIPANT
- THIS IS THE HE
- 810 +
- ONE MORE ANNO
- HEI

POINTS (?)  PREDICTION DETAILS (?)

CORN PLANTED PRED POINTS 600

| HISTORY YEAR (?) | PREDICTION (ACRES) (?) [−][+] | 2004,05 | 2004 | | | | 2002 | | | | | ANNUAL HISTORY AWARD (?) |
|---|---|---|---|---|---|---|---|---|---|---|---|---|
| | | 95,000 ▽ | 96,000 | 97,000 | 98,000 | 99,000 | 100,000 | 101,000 | 102,000 | 103,000 | 104,000 | 105,000 |
| POINTS PER PREDICTION | | 54 | 54 | 54 | 54 | 55 | 55 | 55 | 55 | 55 | 55 | 55 |

POINTS DISTRIBUTION OPTIONS  [↑] UNIFORM  [△] TRIANGULAR  [↘] DECREASING  [↗] INCREASING    HISTORY

SOYBEANS PLANTED PRED POINTS 400

| HISTORY YEAR | PREDICTION (ACRES) [−][+] | 2005 | | | | 2004 | | | | 2002 | 2003 | HISTORY |
|---|---|---|---|---|---|---|---|---|---|---|---|---|
| | | 98,000 ▽ | 99,000 | 100,000 | 101,000 | 102,000 | 103,000 | 104,000 | 105,000 | 106,000 | 107,000 | 108,000 |
| POINTS PER PREDICTION | | 38 | 38 | 38 | 38 | 38 | 38 | 38 | 37 | 37 | 37 | 37 |

POINTS DISTRIBUTION OPTIONS  [↑] UNIFORM  [△] TRIANGULAR  [↘] DECREASING  [↗] INCREASING

TOTAL OF 1,001,700 REWARD POINTS TO WINNER(S) OF ALL CONTESTS OR SUB-CONTESTS NATIONWIDE.

0 UNUSED (?)    SUBMIT —201
1,000 MAXIMUM ALLOCATED POINTS (?)

FIG. 2U

PREDICTION MARKET 240

| HOME PAGE | COUNTY CONTEST | CHANGE MY COUNTY | RULES AND PRIVACY POLICY | MY PREDICTIONS | MY ACCOUNT | MY PROFILE | CATALOG | LOG OFF |

WELCOME (BPM 2006) 241

DATE BETWEEN: [ ] AND: [ ]  [SUBMIT]

| DATE | DESCRIPTION | CONTEST DATES | WINNING PREDICTION | PREDICTION POINTS | AWARD POINTS ||||
|---|---|---|---|---|---|---|---|---|
| | | | | | NEW | CUMULATIVE | TO CATALOG | CUMULATIVE REDEEMED | BALANCE TO BE SENT TO CATALOG |
| 2006-03-20 | SOYBEANS PLANTED CONTEST, BALDWIN COUNTY, ALABAMA | 2006-04-05 TO 2006-04-12 | 29019.04 ACRES | 200 | 145.1 | 145.1 | 0.0 | 0.0 | 145.1 |
| 2006-03-20 | SOYBEANS PLANTED CONTEST, BALDWIN COUNTY, ALABAMA | 2006-04-05 TO 2006-04-12 | 14509.52 ACRES | 200 | 72.55 | 217.65 | 0.0 | 0.0 | 217.65 |
| TOTAL | | | | | 217.65 | 217.65 | 0.0 | 0.0 | 217.65 |

243  244  242  245  246  247  248  249

ANNOUNCE
- HEY
- TEST ANNOU
PARTICIPANT
- THIS IS THE HE
890 +
- ONE MORE ANNO
- HEI

[PRINT]

FIG. 2V

PREDICTION MARKET

WELCOME (BPM 2006)

HOME PAGE | COUNTY CONTEST | CHANGE MY COUNTY | RULES AND PRIVACY POLICY | MY PREDICTIONS | MY ACCOUNT | MY PROFILE | CATALOG | LOG OFF

— 250
— 251

ANNOUNCE
- HEY
- TEST ANNOUN PARTICIPANT
- THIS IS THE HE
- ^@!0 +
- ONE MORE ANNO
- HEI

SELECT SUB-CONTEST(S) — 253

CORN PLANTED
CORN YIELD
CORN HARVESTED
SOYBEANS PLANTED
SOYBEANS YIELD

SELECT STATE(S) — 254

ILLINOIS

SELECT COUNTY(IES) — 255

EFFINGHAM, IL

SELECT DATE RANGE — 256

FROM DATE: 01/01/2006
TO DATE: 05/30/2006

[SEARCH]

YOUR SEARCH HAS RETURNED 2 ROWS

| WEEK # | START DATE (MM/DD/YYYY 12:01 AM CST) | END DATE (MM/DD/YYYY 11:59 PM CST) | SUB-CONTEST | COUNTY, STATE | PREDICTION RANGE | POINTS PLAYED | PREDICTION DATE/TIME (MM/DD/YYYY HH:MM:SS CST) | REVISIONS |
|---|---|---|---|---|---|---|---|---|
| 22 | 05/24/2006 | 05/30/2006 | CORN PLANTED | EFFINGHAM, IL | 95,000–99,000 | 600 | 05/30/2006 03:19:07 | SHOW |
| 22 | 05/24/2006 | 05/30/2006 | SOYBEANS PLANTED | EFFINGHAM, IL | 98,000–102,000 | 400 | 05/30/2006 03:19:07 | SHOW |

PAGE NO: 1 OF 1    PREV | 1–2 | NEXT

PREDICTION MARKET

| | HOME PAGE | COUNTY CONTEST | CHANGE MY COUNTY | RULES AND PRIVACY POLICY | MY PREDICTIONS | MY ACCOUNT | MY PROFILE | CATALOG | LOG OFF |

WELCOME (BPM 2006)

BUNGE PREDICTION MARKET: PREDICTION REVISIONS — MICROSOFT INTERNET EXPLORER PROVIDED BY LARSEN & TOUBRO INFOTECH LIMITED

YOUR SEARCH HAS RETURNED 27 ROWS

YOUR VALID PREDICTION FOR SUB-CONTEST.

| WEEK # | START DATE (MM/DD/YYYY) (12:01 AM CST) | END DATE (MM/DD/YYYY) (11:59 PM CST) | SUB-CONTEST | COUNTY, STATE | PREDICTION RANGE | POINTS PLAYED | PREDICTION DATE/TIME (MM/DD/YYYY HH:MM:SS CST) |
|---|---|---|---|---|---|---|---|
| 22 | 05/24/2006 | 05/31/2006 | CORN PLANTED | EFFINGHAM, IL | 95,000-99,000 | 600 | 05/30/2006 03:19:07 |
| 22 | 05/24/2006 | 05/31/2006 | CORN PLANTED | EFFINGHAM, IL | 95,000-105,000 | 600 | 05/30/2006 03:17:18 |
| 22 | 05/24/2006 | 05/31/2006 | CORN PLANTED | EFFINGHAM, IL | 95,000-105,000 | 600 | 05/30/2006 03:17:01 |
| 22 | 05/24/2006 | 05/31/2006 | CORN PLANTED | EFFINGHAM, IL | 95,000-105,000 | 600 | 05/30/2006 03:16:38 |
| 22 | 05/24/2006 | 05/31/2006 | CORN PLANTED | EFFINGHAM, IL | 95,000-105,000 | 600 | 05/30/2006 03:16:10 |
| 22 | 05/24/2006 | 05/31/2006 | CORN PLANTED | EFFINGHAM, IL | 95,000-105,000 | 600 | 05/30/2006 03:15:50 |
| 22 | 05/24/2006 | 05/31/2006 | CORN PLANTED | EFFINGHAM, IL | 95,000-105,000 | 600 | 05/30/2006 03:14:00 |
| 22 | 05/24/2006 | 05/31/2006 | CORN PLANTED | EFFINGHAM, IL | 95,000-105,000 | 600 | 05/30/2006 03:13:39 |
| 22 | 05/24/2006 | 05/31/2006 | CORN PLANTED | EFFINGHAM, IL | 95,000-105,000 | 600 | 05/30/2006 03:13:18 |
| 22 | 05/24/2006 | 05/31/2006 | CORN PLANTED | EFFINGHAM, IL | 95,000-105,000 | 600 | 05/30/2006 03:13:02 |
| 22 | 05/24/2006 | 05/31/2006 | CORN PLANTED | EFFINGHAM, IL | 95,000-105,000 | 600 | 05/30/2006 03:12:44 |

270, 271, 272

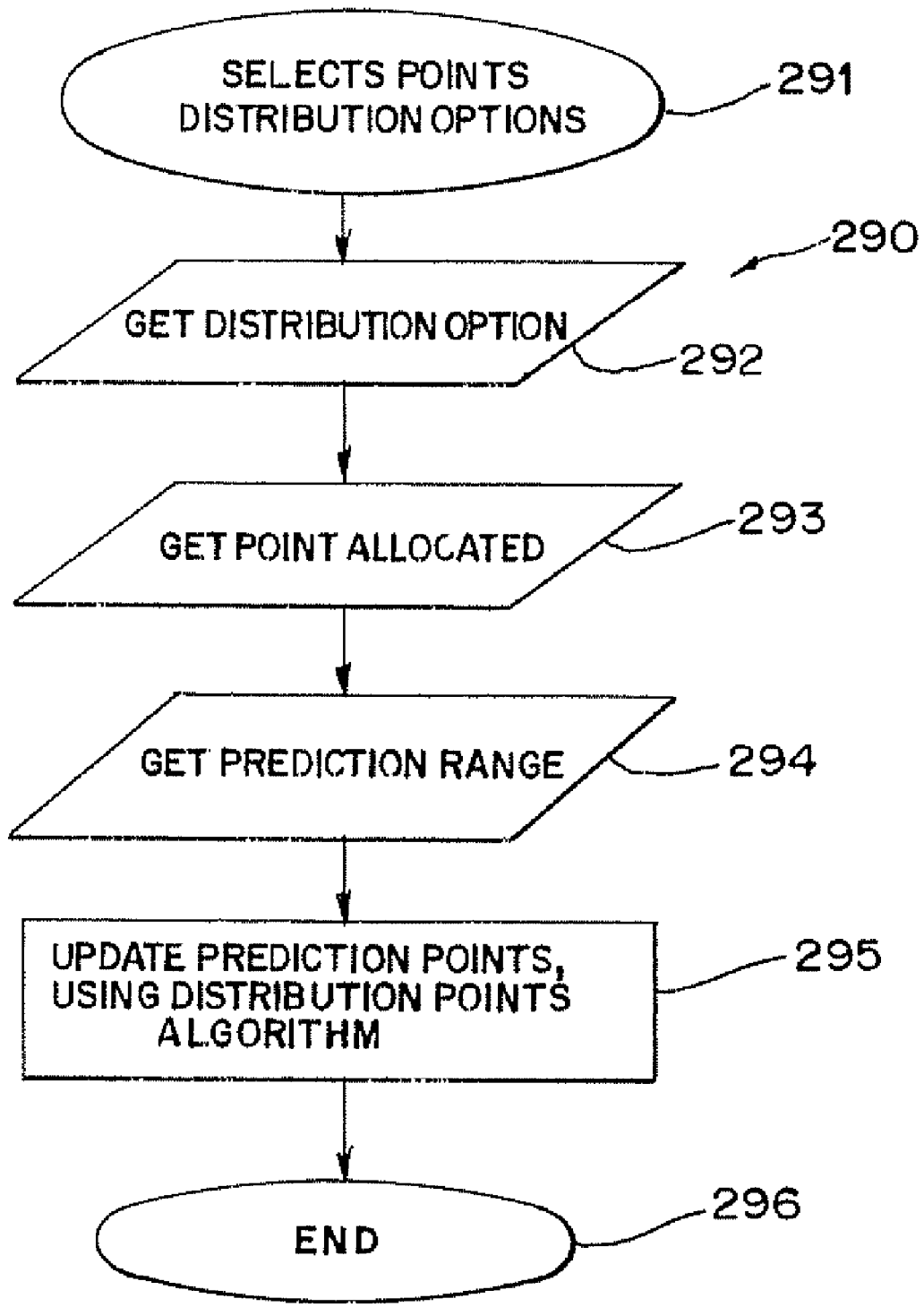

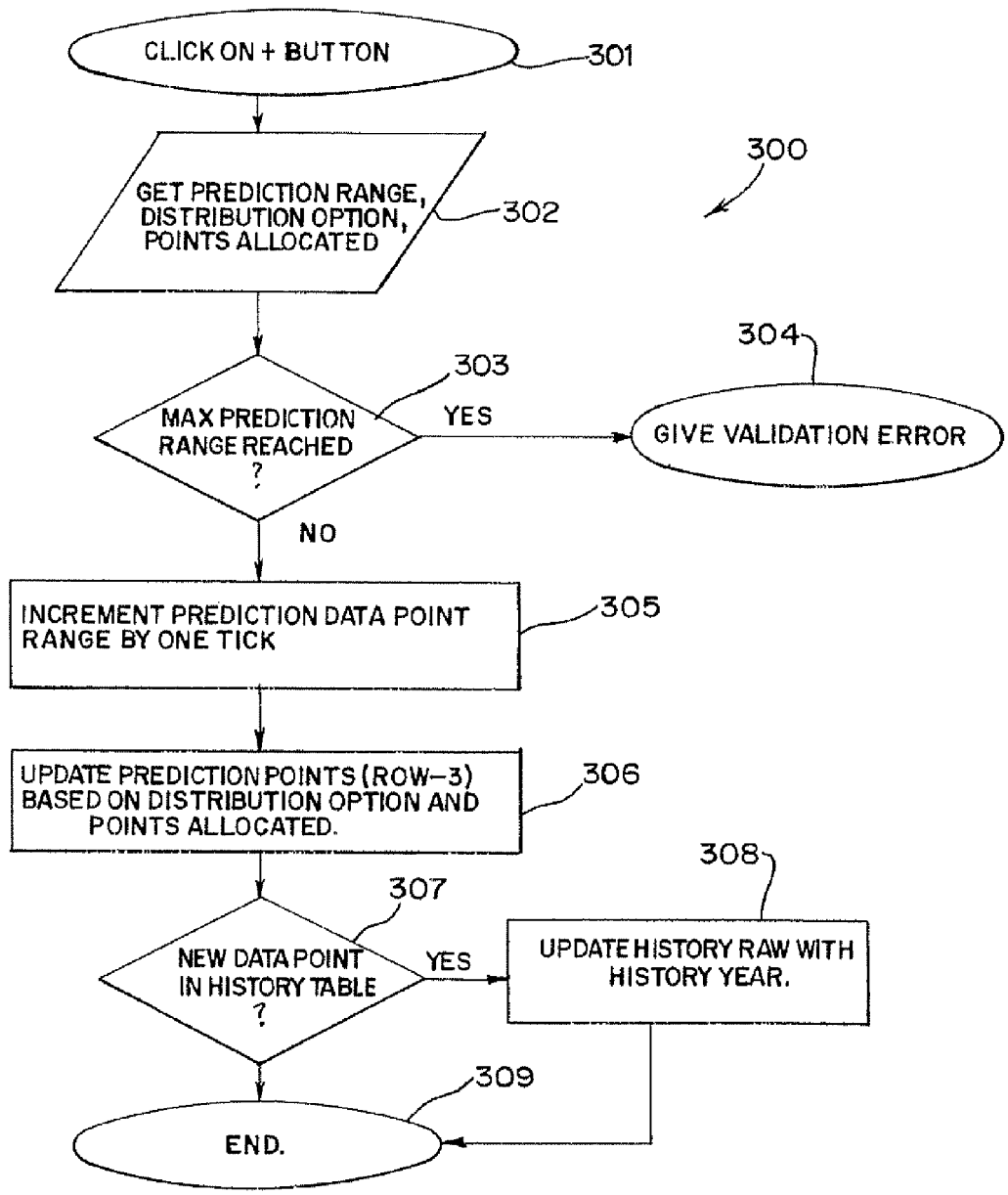

SYSTEMS AND USER INTERACTIVE SCREENS FOR ESTIMATING EVENTS OR CONDITIONS

CROSS-REFERENCE TO RELATED PATENT APPLICATION

This patent application is a non-provisional of prior provisional patent application Ser. No. 60/747,504, filed on May 17, 2006, the right of priority of which is hereby claimed for this patent application.

FIELD OF THE INVENTION

The present invention relates generally to systems and user interactive screens which are useful in conducting surveys and contests for estimating events or conditions.

BACKGROUND OF THE INVENTION

Prediction markets are designed to aggregate information and produce predictions about future events. Prediction markets are also known as "idea futures" and "information markets". Future events could range from a political candidate's reelection, the box office take for a particular movie, to the probability that the Federal Reserve will increase interest rates at its next meeting.

Some operators of prediction markets use a standard futures contract to elicit or encourage participation in the predictions. The contract payoffs are tied to the outcome of an unknown future event, and the price at which the contract trades reflects the market's consensus opinion. For example, a contract might pay $100 if a candidate is reelected to office, or nothing if he/she is not reelected. Until the outcome of the election is decided, the trading price reflects the traders' collective consensus about the expected value of the contract. The expected value of the contract is typically proportional to the probability of the candidate's reelection. Such prediction markets thus assist in arriving at a consensus of the estimate of the most likely outcome of the future event, and the predictions can be used in related decisions.

Some types of prediction markets currently operate on the internet. For example, the Iowa Electronic Markets (IEM) can be found at the internet address http://www.biz.uiowa.edu/iem/index.html. This site is primarily concerned with political markets and economic indicator markets and it is also used for teaching and research.

Another internet site concerned with prediction markets is the Hollywood Stock Exchange (HSX). It can be found at the internet address http://www.hsx.com. HSX is a virtual stock exchange that allows trading in shares of actors, directors, upcoming films and film-related options. One of its more popular events is to predict the box office gross receipts during the first four weekends of the release of a new film. The price of the stock associated with the new film typically reflects the anticipated box office gross receipts.

The U.S. Department of Agriculture also conducts periodic surveys. However, such surveys are generally out of date by the time that they are published or become publicly available. Thus, the results of these surveys have primarily historical value.

Various other kinds of surveys exist to elicit opinions of participants. For example, surveys of the type that ask whether you agree, strongly agree, mildly disagree or strongly disagree with an expressed statement or opinion are well-known. Often these surveys are conducted at a single point in time. Moreover, if follow-up surveys are conducted on subsequent dates, the opinions expressed by the participants may be unlikely to change from the few choices or categories provided. That is, even if a participant's opinion changes somewhat between the times of the surveys, the amount or degree of change may not be enough to sway the participant to select a different category, such as moving from agree choice to mildly disagree choice. On the other hand, if a participant does change his/her opinion from agree to mildly disagree, the change in degree may be exaggerated due to the limited number of selectable options or choices. Obtaining timely, accurate and meaningful information from a survey is not an easy task.

There has therefore been a long-felt need for improved systems for conducting surveys or contests and for improved user interactive screens which obtain richer informational content and feedback from the participants.

A general object of the present invention is to therefore provide improved systems and user interactive screens for conducting surveys or contests to obtain richer informational content from the participants.

Another object of the present invention is to provide improved systems and user interactive screens for conducting surveys or contests to obtain informational from participants over a period of time, such as at spaced time intervals or during different phases of a crop cycle.

A further object of the present invention is to provide systems and user interactive screens which encourage participants to revise their current estimates within the time interval of the current contest.

Yet another object of the present invention is to enable the participants to express levels of confidence in their estimates of an event or a condition.

A still further object of the present invention is to provide systems and user interactive screens which utilize points per estimation for each of the estimations entered in the contest.

Another object of the present invention is to provide systems and user interactive screens which utilize distribution options for the points per estimation, such as uniform distribution, triangular (peaked) distribution, increasing distribution and decreasing distribution.

Yet another object of the present invention is to provide systems and user interactive screens which continuously receive estimations in a rich data format from a significant number of participants.

SUMMARY OF THE INVENTION

The present invention is directed to systems for obtaining estimations from a plurality of participants in a contest. The system includes a data processor to generate user interactive screens and to communicate the user interactive screens to a plurality of participants. The user interactive screens include a contest grid, the grid containing a second plurality of spaces for entering a plurality of estimations relating to an event or condition. Preferably, the user interactive screens provide a sub-contest grid for each of a plurality of sub-contests relating to a plurality of different events or conditions. For example, sub-contests may be selected from a group of sub-contests consisting of corn planted, soybeans planted, wheat planted, corn harvested, soybeans harvested, wheat harvested, price of corn, price of soybeans and price of wheat.

The systems also generate and communicate user interactive screens with a sub-contest grid for each sub-contest, with the grid containing a third plurality of spaces for entering a points per estimation for each estimation in the second plurality of spaces; a second row in each sub-contest grid, the second row contains the second plurality of spaces for entering the plurality of estimations in the second row; a third row in each sub-contest grid, the third row contains the third plurality of spaces for entering the points per estimation for each of the plurality of estimations in the second row; and a first row consists of a first plurality of spaces in each sub-contest grid for displaying a prior year in the event that one of the plurality of estimations in the second row matches historical information from a prior year.

The systems also generate and communicate user interactive screens with fields for allocating a plurality of points per contest; a field for each sub-contest in which the plurality of points per contest may be partially or entirely allocated between the sub-contests; a field for selection of a state and county for the contest. The participant may be permitted to change his/her estimations, the points per estimation or the points per sub-contest during a period of time while the contest is active. Preferably, the user interactive screens include a points per distribution option that, when selected by the participant, automatically changes the distribution of the points per estimation in the third row of the contest grid. The points per distribution option may be selected from a group of options consisting of a uniform distribution, a triangular (peaked) distribution, an increasing distribution or a decreasing distribution.

The present invention is also directed to user interactive screens for estimating events or conditions. The user interactive screens include a contest grid, the grid containing a second plurality of spaces for entering a plurality of estimations relating to the event or condition. Preferably, the user interactive screens include a contest grid for each of a plurality of sub-contests relating to a plurality of different events or conditions. For example, the plurality of sub-contests may be selected from a group of sub-contests consisting of corn planted, soybeans planted, wheat planted, corn harvested, soybeans harvested, wheat harvested, price of corn, price of soybeans and price of wheat.

Preferably, the user interactive screens contain a grid for each sub-contest including a third plurality of spaces for entering a points per estimation for each estimation in the second plurality of spaces. The grid in the user interactive screens may also have a second row, the second row containing the second plurality of spaces for entering the plurality of estimations in the second row; a third row, the third row containing the third plurality of spaces for entering the points per estimation for each estimation in the second row; and a first row consisting of a plurality of spaces, the first row for displaying a prior year in the event that one of the plurality of estimations in the second row matches historical information from a prior year.

The present invention may also include user interactive screens with a plurality of points per contest, and a field for each sub-contest in which the plurality of points per contest may be partially or entirely allocated between the sub-contests. The user interactive screens may further include a field for selection of a state and county for the contest, or other basis that defines the scope of a contest, such as geographic, time or the like. A points per distribution option may be included that, when selected by the participant, automatically changes the distribution of the points per estimation in the third row of the contest grid. The points per distribution option may be selectable from group of options consisting of a uniform distribution, a triangular (peaked) distribution, an increasing distribution or a decreasing distribution

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which:

FIGS. 2A-2X illustrate a series of typical user interactive screens which demonstrate how a participant in a contest may enter his/her estimations in accordance with the present invention; and FIGS. 3A-3D are flow charts illustrating typical steps utilized by the present invention in conducting contests.

DESCRIPTION OF THE PREFERRED EMBODIMENTS

It will be understood that the present invention may be embodied in other specific forms without departing from the spirit thereof. The present examples and embodiments, therefore, are to be considered in all respects as illustrative and not restrictive, and the invention is not to be limited to the details presented herein.

Unlike other prediction markets, the methods of the present invention enable users to express their opinion, impression or estimation of a future event or condition in terms of an estimation range. Moreover, the methods of the present invention enable users to allocate different weight to each point within the estimation range. Typically, the user logs onto a website which has a contest on a certain event or concerning certain subject matter.

For example, the subject matter of the contest may be agricultural crop events or conditions, such as number of acres planted in a county, the yield in bushels per acre, the price of the crop in dollars per bushel, and the like. An internet site is provided for entry of information by participants, who may include customers, farmers, ranchers and other persons in the agriculture business supply chain. For such an agricultural crop contest, farmers are the preferred participants since they are the local crop experts and they can provide more accurate information on current crop events or conditions, as compared to other market experts. Farmers also have first hand information on many aspects of crop condition. Thus, farmers are invited and encouraged to register and to participate in such a crop condition contest.

Figure 1B:
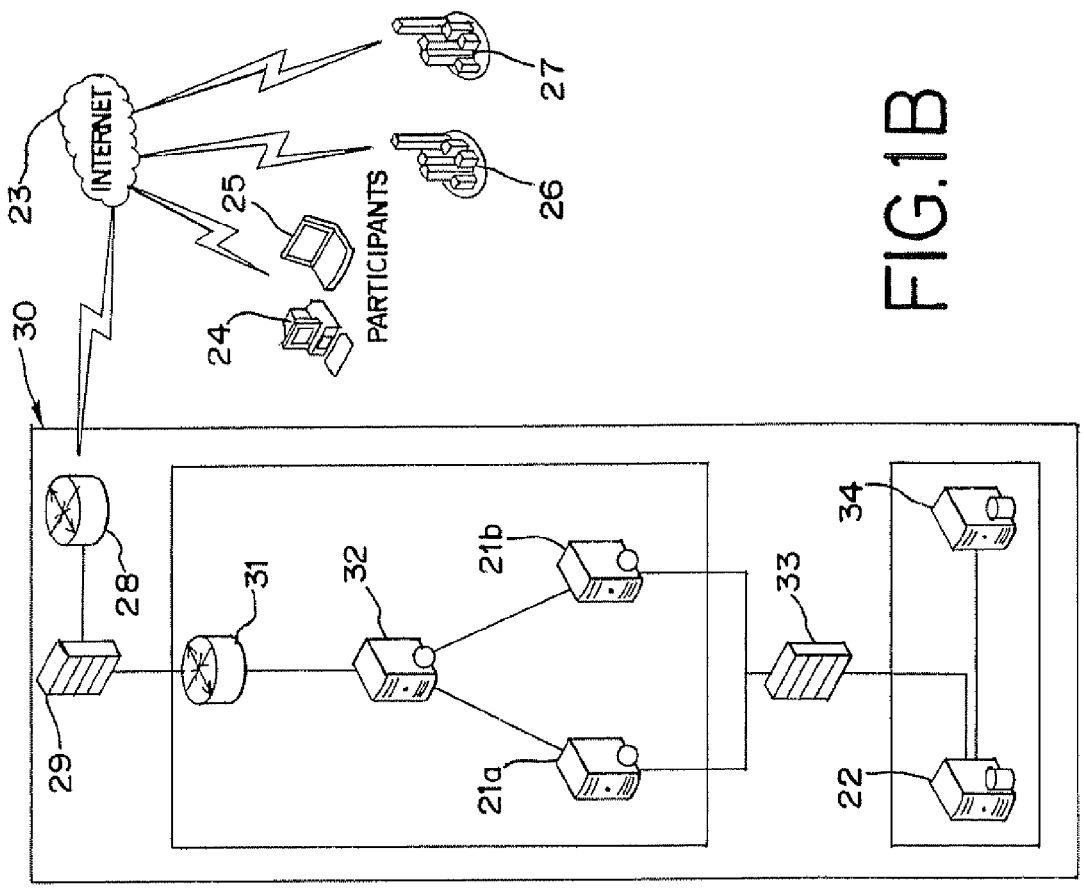
FIG. 1B is a more detailed diagram of a typical system for receiving estimations from participants in contests in accordance with the present invention.
Figure 1A:
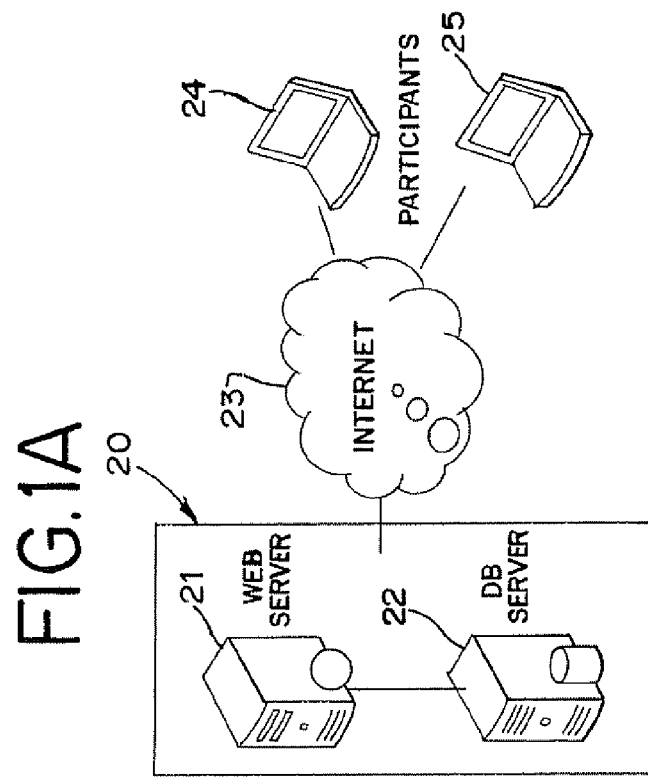
FIG. 1A is a simplified diagram of a typical system for receiving estimations from participants in contests in accordance with the present invention.

FIG. 1A is a simplified diagram of a typical system, generally designated 20, for receiving estimations from participants in contests in accordance with the present invention. The system 20 includes a web server 21 and a database server 22. Web server 21 is in communication with the internet 23, which in turn, is in communication with a plurality of communication devices, such as laptop computers 24 and 25 of participants in the contests of the present invention. While laptop computers 24 and 25 are shown in FIG. 1A, it will be appreciated that any suitable type of internet capable communication device may be used, such as desktop computers, portable Pocket PC computers and the like. In the simplified system of FIG. 1A, the system 20 communicates with the participants' computers 24 and 25, such as by providing user interactive screens of the types shown in FIGS. 2A-2X, and by receiving inputs to the screens from the participants. The database server 22 stores the inputs of the participants in its database. Based upon a participant's inputs, the next screen is determined and sent by the web server 21 to the participant's computer 24 or 25. While two computers are shown in FIG.

1A, it will be appreciated that system 20 may be in communication with hundreds, or more, of computers. System 20 thus operates as a data processor to generate and to communicate user interactive screens to the participants and to receive the information entered on the user interactive screens by the participants.

FIG. 1B is a more detailed diagram of a typical system, generally designated 30, for receiving estimations from participants in contests in accordance with the present invention. A router WAN 28 forwards information between the internet 23 and the system 30 according to routing policy. A firewall 29 filters packets of information between the internet 23 and the other portions of system 30 and provides protection against hackers and undesired intrusions. A load balancer 31 balances the load between web servers 21*a* and 21*b* under normal conditions. It one of the web servers 21*a* or 21*b* fails or becomes inoperative, load balancer 31 switches traffic to the operative server 21*a* or 21*b*. Load balancer 31 constantly monitors the availability of web servers 21*a* and 21*b*, and any other servers if available. A reverse proxy 32 provides a second level against potential intruders. It also caches images and static web pages, which decreases the data processing load on web servers 21*a* and 21*b*, thereby permitting the web servers to operate at higher efficiency. An additional firewall 33 may be implemented to provide still further protection against unwanted intrusions into database server 22. A tape library 34 provides backup for database server 22.

System 30 is in communication via internet 23 with computers 24 and 25 of participants in the contests. System 30 thus operates as a data processor to generate and to communicate user interactive screens to the participants and to receive the information entered on the user interactive screens by the participants. System 30 is also in communication via internet 23 with data processing centers 26 and 27. Data processing centers 26 and 27 receive information on participants' entries into the screens, such as those shown in FIGS. 2A-2X, and process such information to determine winners of contests and to evaluate the estimations. For example, the data processing centers may measure any relative change in the estimations, determine flat averages, determine any rate of change in the estimations, determine any convergence or divergence in the estimations, and the like. Centers 26 and 27 may also analyze the estimations entered by participants for any patterns, trends, and the like. Centers 26 and 27 may also determine which participants are leaders in terms of fairly consistent accuracy of their estimations. Such leaders may be more closely tracked in future contests and their estimations may also be given heavier weight in determining trends or other factors.

FIGS. 2A-2X are a series of user interactive screens which illustrate how a participant in a contest may enter his/her estimations in accordance with the present invention. A screen, generally designated 40, in FIG. 2A may be the first screen that a user sees after registering as a participant in the contest. In this example, the registered user is identified in a field 41 and a field 42 indicates that this user is registered in Adams County, Iowa. By default, first time users will be shown the contest for the county in which they are registered. If no contest is configured for the registered county, a message may appear that no contest is currently available. The user may be invited to participate in another county or jurisdiction, such as by clicking on a Change State/County link 43. Alternately, the user may change county by selecting a Change My County tab 44 near the top of the screen 40.

Preferably, the contest extends over a period of time, which is divided into multiple time segments. This permits the user to enter an estimate during each of the time segments such that multiple estimations are entered by the participant over the period of time that the contest is running. For example, if the contest relates to the planting of agricultural crops, the contest may run for a time period of several weeks, or more, with each time segment being about one week. Thus, the user can enter a new estimation each week of the contest. Thus, a field 45 in FIG. 2A indicates the starting time of the current time segment and a field 46 indicates the ending time of the current time segment. Another field 47 displays the time remaining in the current time segment. The utility of other portions or fields of screen 40 will be described in other Figures below.

It will be appreciated that, in such a contest that is active over about several weeks, the contest in its initial week operates similarly to a prediction market contest because the participant is estimating a future event or condition. After a few weeks have elapsed and in the later stages of the contest, the participant may still be estimating an event such as crop planting into a future week or weeks. However, he/she may also be revising estimates made in earlier weeks which are now no longer a future event. Thus, the contest continues to elicit the participant's observations, opinions and estimates of recently past and of current conditions, in addition to the participant's future predictions. For example, if bad weather occurred during the past week resulting in relatively poor planting conditions, a participant may wish to decrease a prior estimate of the number of acres planted during the past week. Due to delays in determining of the number of acres actually planted during any particular week, participants are unable to change prior estimates based upon knowledge of actual results. Conversely, if field conditions during the past week were better than normal for planting, the participant may wish to increase a prior estimate. Thus, the contests of the present invention are broader than a prediction market contest that concerns solely a future event.

The surveys and contests of the present invention also provide real time input from the participants, which can be analyzed to determine each participant's level of confidence concerning the subject matter of the contest. Revisions in a participant's estimations also provide early insight into trends or patterns which may be developing. Effectively, such revisions may be a form of feedback in the confidence level of the participant.

If the user clicked on the Change State/County link 43 in FIG. 2A, a subsequent screen 50 will appear as shown in FIG. 2B. Screen 50 is associated with the Change My County tab 44. Field 42 reminds the user that the county and state are Adams County, Iowa, as in the prior screen 40. A new field 51 will appear to permit the user to select a different state. However, before the user selects a different state, a drop down field 52 will display other counties in the default state, which is Iowa in this example. A subfield 53 of field 52 may include a description of the types of contests currently active in the respective counties. Thus, the user may select a different county in the default state by clicking on one of the radio buttons 54 of field 52 that corresponds to the county of choice. If any counties do not have a configured contest, the corresponding radio button 54 may be disabled such that those counties cannot be selected.

In FIG, 2C, the user has clicked on the change state field 51 in screen 60. Field 51 opens to display all states of interest, or alternatively, those states which have active contests. In this example, the user selects the state of Illinois from the listing of states in field 51. Field 2D in screen 70 of FIG. 2D then confirms that the state of Illinois has been selected.

When a different state is selected, screen 80 in FIG. 2E, field 52 will display the counties available for selection in that state. In this example, Effingham County in Illinois has been selected by clicking the appropriate radio button 54. The user may then complete this selection by activating a submit button 81, or cancel the selection by activation of cancel button 82.

If submit button 81 was activated in screen 80, a new screen 90 in FIG. 2F displays the newly selected county and state in field 42. A contest grid 91 appears for the selected county/state in screen 90. In this example, contest grid 91 includes two sub-contests, corn planted 92 and soybeans planted 93. An award field 94 may be activated to display an award available to the winners of this contest. As illustrated in screen 90, if the user is playing for the first time, grid 91 will not contain any prior estimations of the user. However, if the user has previously played in this contest, grid 91 will contain prior estimations.

Figure 2G:
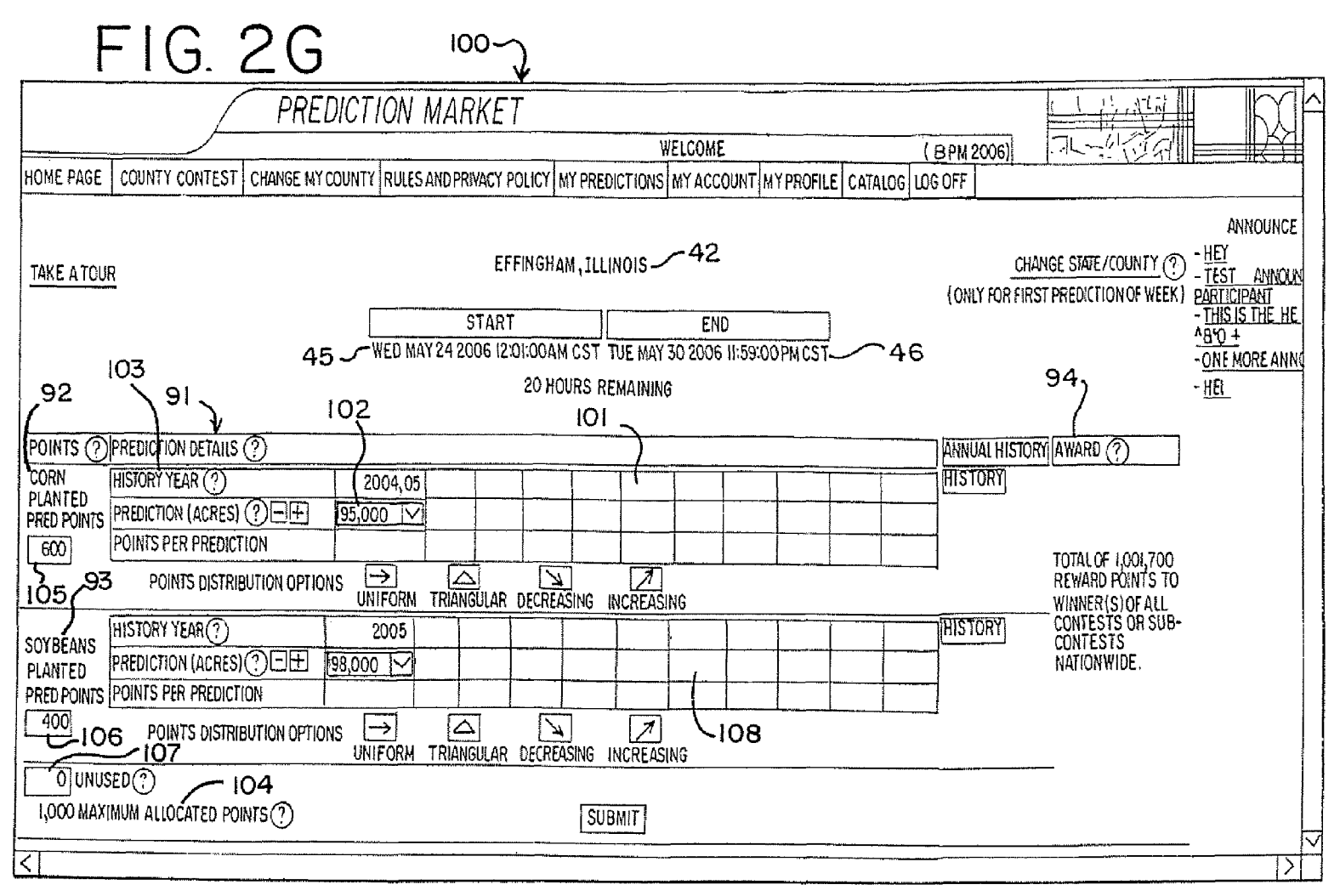

In screen 100 of FIG. 2G, a middle portion of contest grid 91 consists of a point estimation distribution table 101 for the corn sub-contest 92. A similar point estimation table 108 is used for the soybean sub-contest 93. Tables 101 and 108 have three rows and a number of columns for estimating data points. Hereafter, these three rows will be identified as the first row for history, the second row for estimations of numbers of acres and the third row for the points per estimation. In this example, the estimation is the number of acres of specific crops that will be planted in the current year in the county identified in field 42. By default, a drop down field 102 near the left end of the second row of tables 101 and 108 will list the number of acres planted in the prior year from the records of the UPS. Department of Agriculture (USDA), rounded off to the nearest 1000 acres. By activating a history button 103 near the right end of the row of tables 101 and 108, the user can view the planting history from prior years, such as up to five prior years, as seen in FIG. 2I. As indicated at field 104, a maximum number of 1000 points may be allocated in this contest. The user in screen 100 has elected to allocate 600 of these 1000 points in field 105 for corn and the remaining 400 points in field 106 for soybeans, leaving 0 unallocated points in field 107. Note that the number of points allocated in fields 105 and 106 are then the number of points available as Points per Estimation in the third row of tables 101 and 108, respectively.

The allocation of the available 1000 points between fields 105 and 106 may be an indication of the participant's level of confidence. For example, if a high percentage of points is used in one of the sub-contests 92 or 93 and a low percentage of points is used in the opposite sub-contest, such allocation may express a lack of confidence in estimations made in the sub-contest with the fewest allocated points and a high level of confidence in the estimations made in the sub-contest with the most allocated points. Similarly, if not all of the 1000 points are allocated between the sub-contests 92 and 93, this may effectively express a lower level of confidence in the estimations made in each of the sub-contests 92 and 93.

Figure 2H:
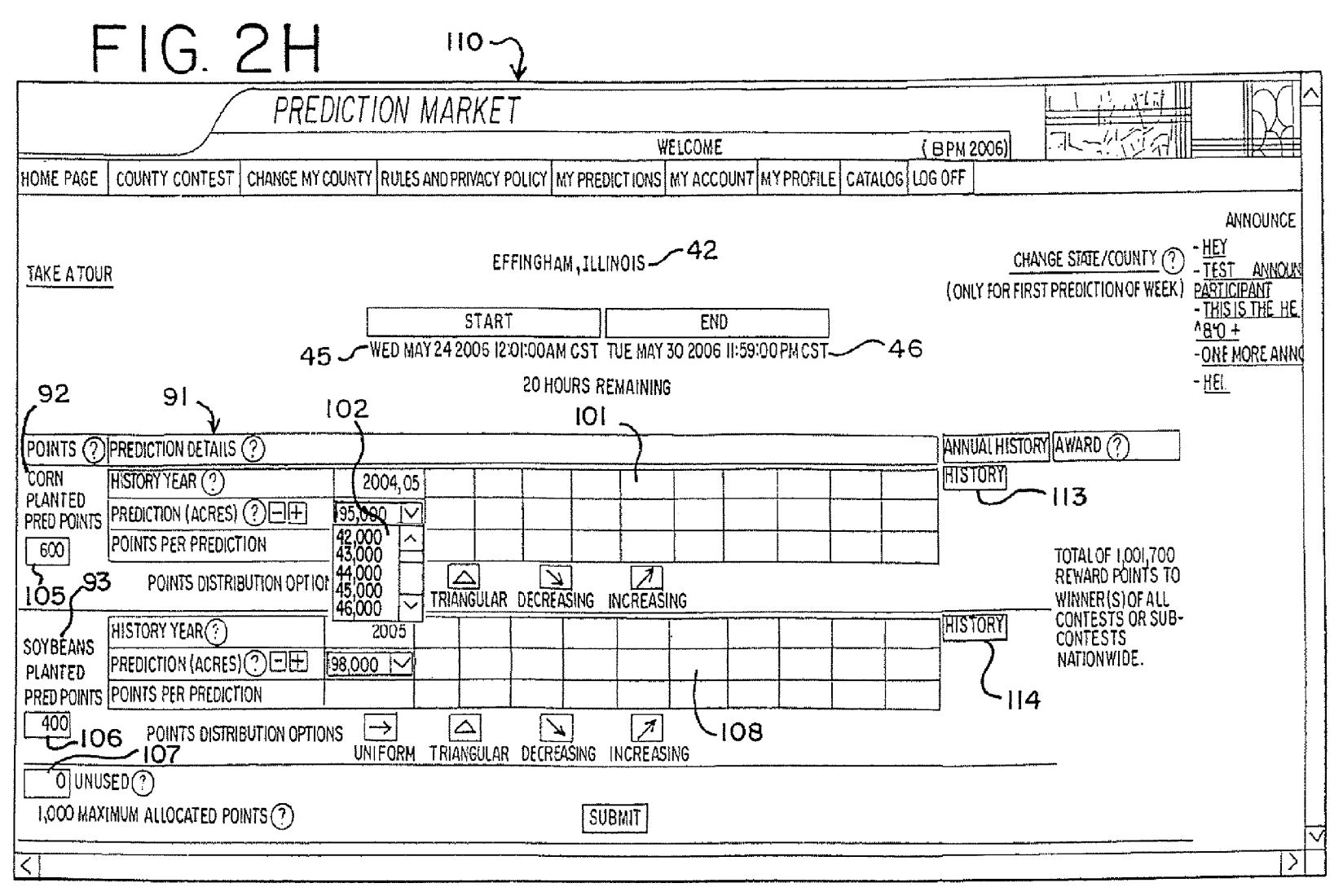
Figure 2I:
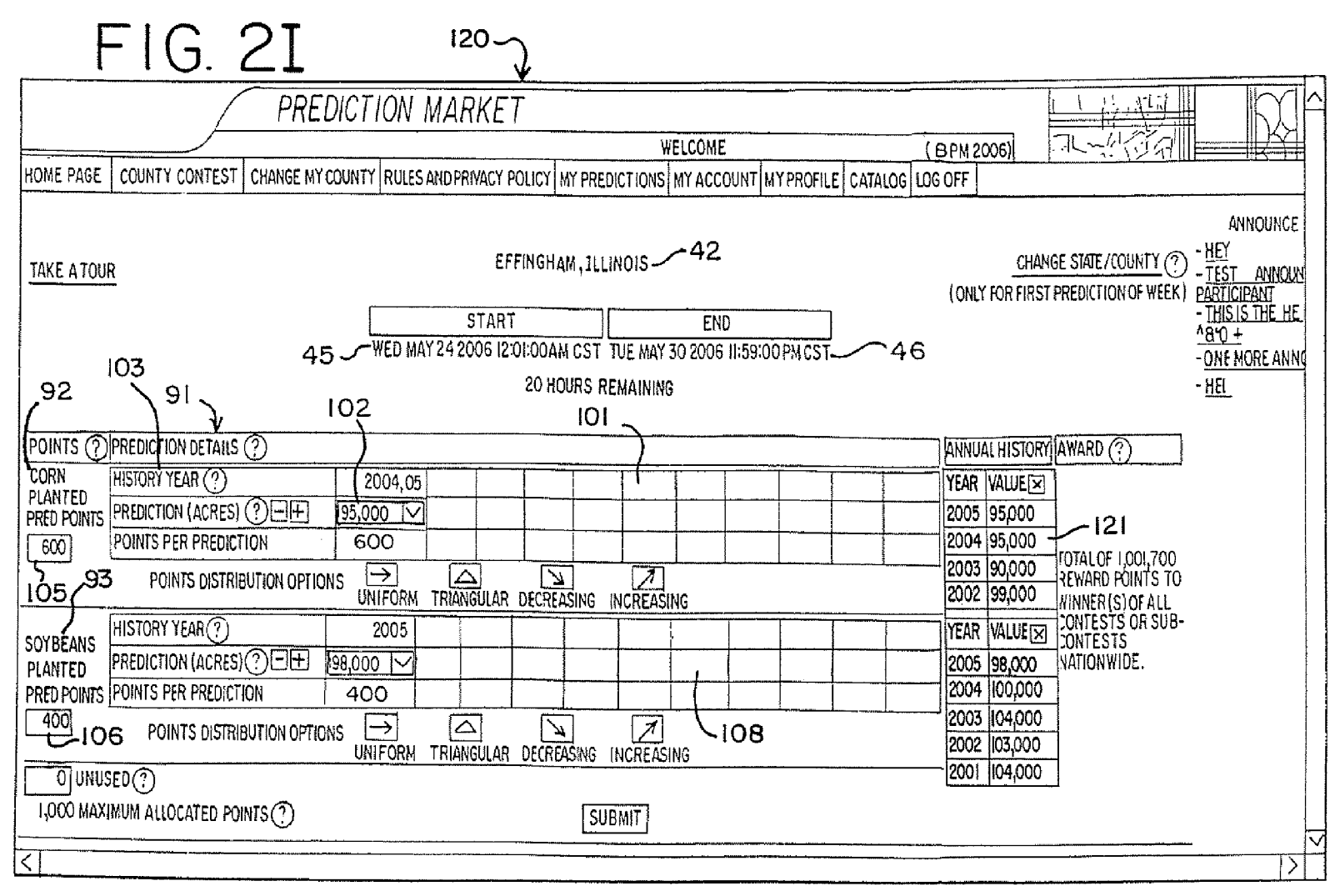

In FIG. 2H, field 102 in the corn sub-contest 92 has been activated to display the available selections for estimating the number of acres that will be planted in the current year. The user may select one of the available choices or may manually enter an estimate in field 102. In a similar fashion, the user may estimate the number of acres of soybeans that will be planted in the soybean sub-contest 93.

To provide historical background in assisting in the estimation for the current year, information from prior years is available. If the History button 103 in FIG. 2H is activated, a drop down field 121 will appear in screen 120 of FIG. 2I for each of the two sub-contests 92 and 93. For example, historical records from the USDA for the past five years may be displayed for each crop.

Figure 2J:
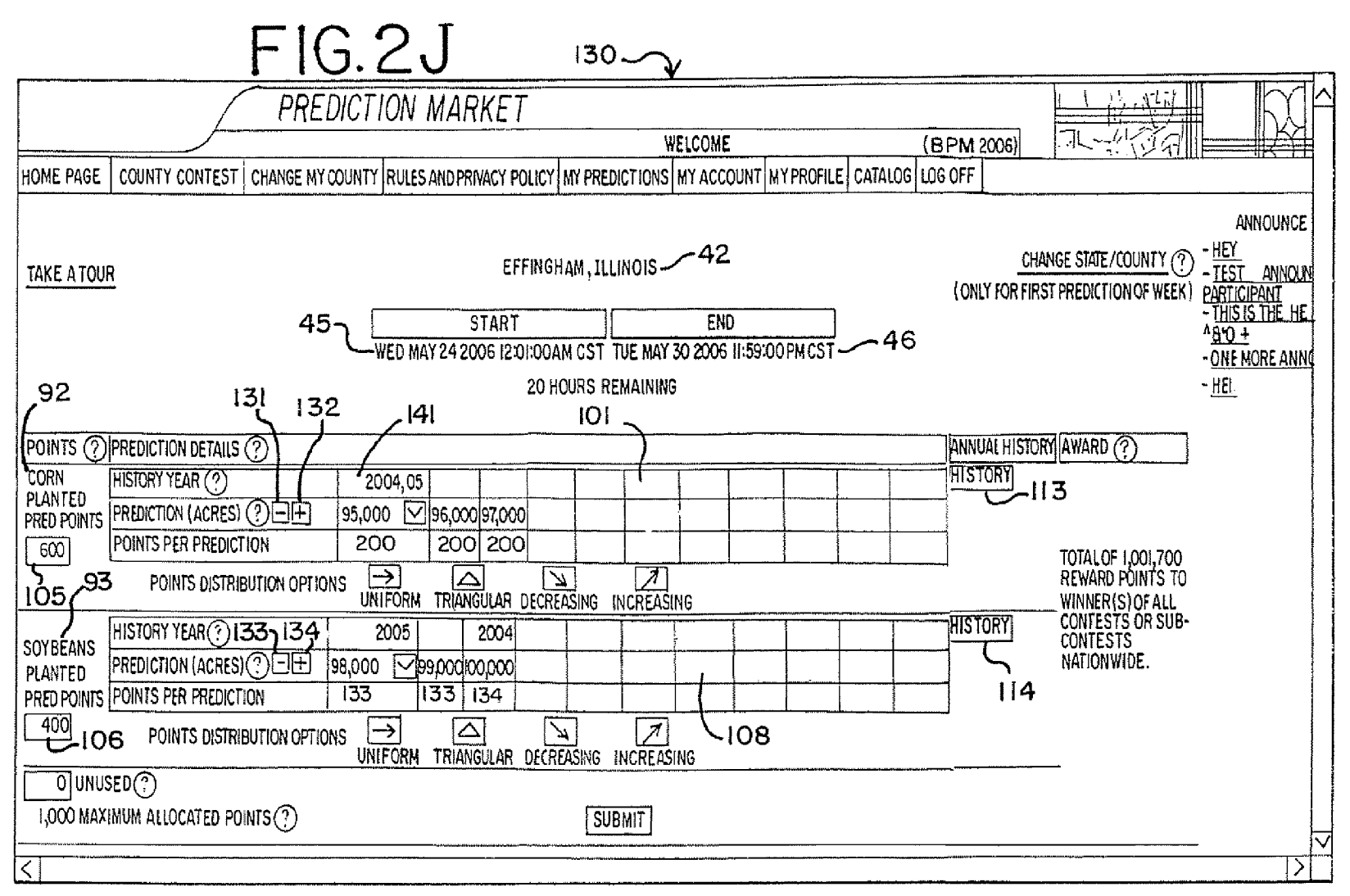

In FIG. 2J, the + buttons 132 and 134 and the − buttons 131 and 133 increase or decrease the estimation range in the second row of the contest grids 101 and 108, respectively. If the user clicks on + button 132 or 134, the next data point appears in the next column of the second row. The third row then distributes the previously selected estimation points in fields 105 and 106 between the data points. Since there are three data points in this example and 600 estimation points were selected for the corn planting contest in sub-contest 92, 200 estimation points are allocated to each of the three data points in the second row. By default, the estimation points will initially be uniformly distributed amongst the data points. In a similar manner, the 400 estimation points for the soybean planting sub-contest 93 are uniformly distributed amongst the data points.

Screen 140 in FIG. 2K illustrates an extension of the selection process of FIG. 2J. With every click of the + button 132 or 134, the next data point appears in the middle row of grid 101 or 108. In the example of FIG. 2K, each of the data points has been increased by a predetermined tick value of 1000 acres. Thus, the data points range from 95,000 acres at the beginning to 105,000 acres at the end. Note that if the data points match the history for a prior year that the prior year will appear in the first row immediately above the corresponding data point. Thus, the first data point of 95,000 acres in box 141 in corn planting sub-contest 92 is the same as the historic planting records for the years 2004 and 2005. In a like manner, the fifth data point of 99,000 acres in box 142 is the same as for the year 2002, which appears above this data point. Similar information can be seen in the soybean planting contest 93 in this example.

As in FIG. 2J, the points per estimation in the bottom row of each of the sub-contests are evenly distributed by default. The points per estimation entered by the participant in the third row of grids 101 and 108 may be interpreted as levels or degrees of confidence in each of the individual estimations in the second row of grids 101 and 108.

Figure 2L:
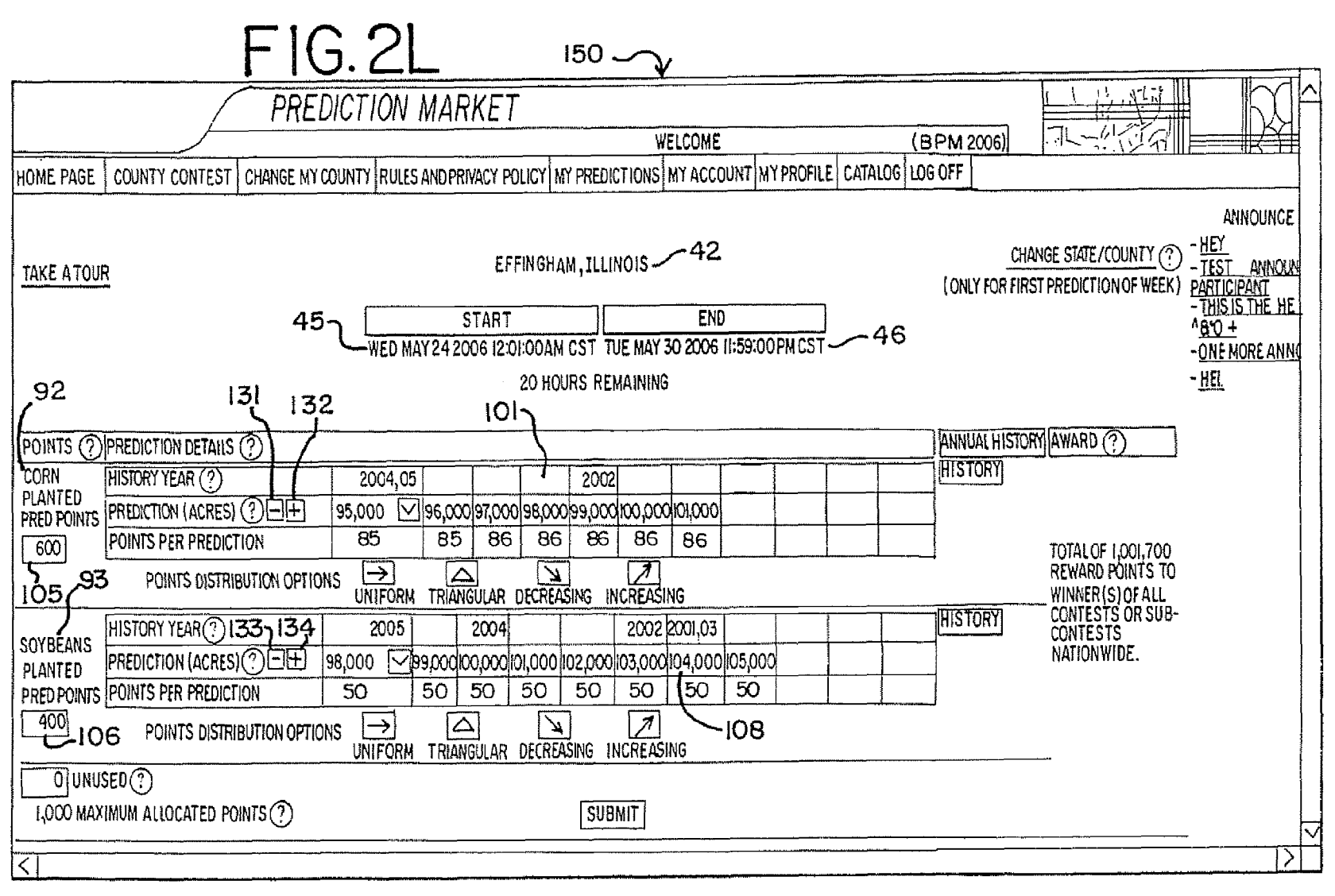

Screen 150 in FIG. 2L illustrates the reverse procedure of using the − button 131 or 133. For each click of the − button 131 or 133, the last available data point in the second row of grid 101 or 108 is deleted. In this example, as compared to screen 140 in FIG. 2K, the last four data points have been deleted. With each deletion of a data point in the second row, the points per estimation in the third row are automatically adjusted in accordance with the default uniform distribution for the number of remaining data points.

Figure 2M:
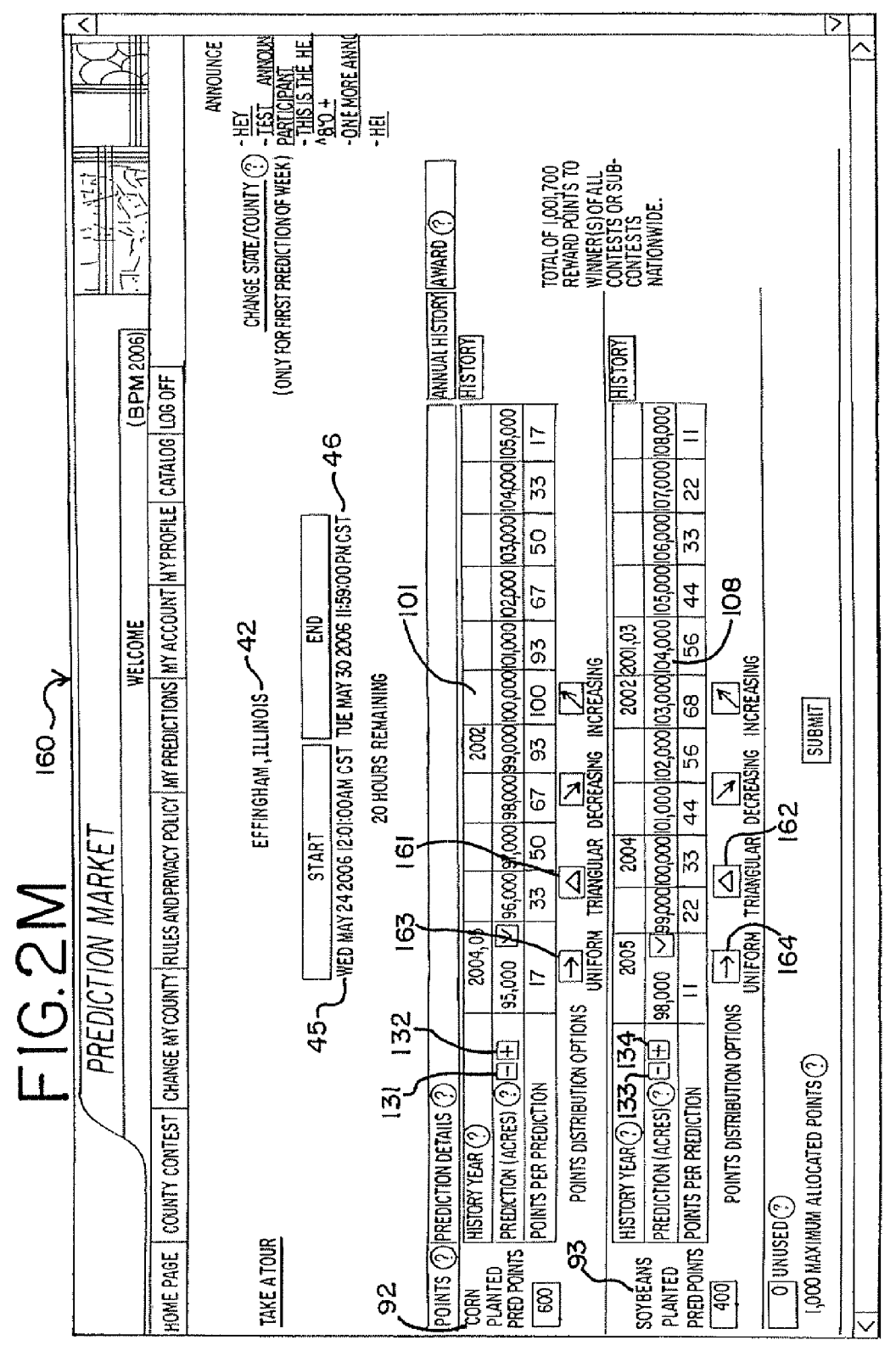

Other than the default uniform distribution, the user may select other distributions of the points per estimation in the third rows of grids 101 and 108. In screen 160 shown in FIG. 2M, the user clicks on a triangular distribution option 161. Triangular distribution option 161 causes the points in the third row to be allocated in a triangular fashion. That is, more points are distributed toward the center data points than at the ends of the estimation range. With this option, distributed points are rounded to the nearest full integer and the difference is adjusted towards the center of the distribution. A similar triangular distribution option 162 is provided for the soybean sub-contest 93 to similarly distribute the points per estimation in a peaked manner near the center of the data points, if selected by the user. If the user wishes to return to a uniform distribution, he/she may activate a uniform distribution option 163 for sub-contest 92 or a uniform distribution option 164 for sub-contest 93. Of course, the user may select a triangular distribution option for the corn planting sub-contest 92 and a uniform distribution option for the soybean planting sub-contest 93, or vice versa.

Screen 170 in FIG. 2N demonstrates the use of a decreasing distribution option 171. When this distribution is selected, the points per estimation in the third row of grid 101 are allocated in decreasing order. This allows more points at the start of the estimation range and then linearly decreases towards the end of the estimation range. Distributed points are rounded to the nearest full integer and the difference is adjusted towards the start of the range. Decreasing distribution option 172 performs a similar point distribution in grid 108 of the soybean planting contest 93.

Screen 180 in FIG. 2O demonstrates the use of an increasing distribution option 181. When this distribution is selected, the points per estimation in the third row of grid 101 are allocated in increasing order. This allows more points toward the end of the estimation range and then linearly decreases towards the start of the estimation range. Distributed points are rounded to the nearest full integer and the difference is adjusted towards the end of the range. Increasing distribution option 182 performs a similar point distribution in grid 108 of the soybean planting contest 93.

Figure 2P:
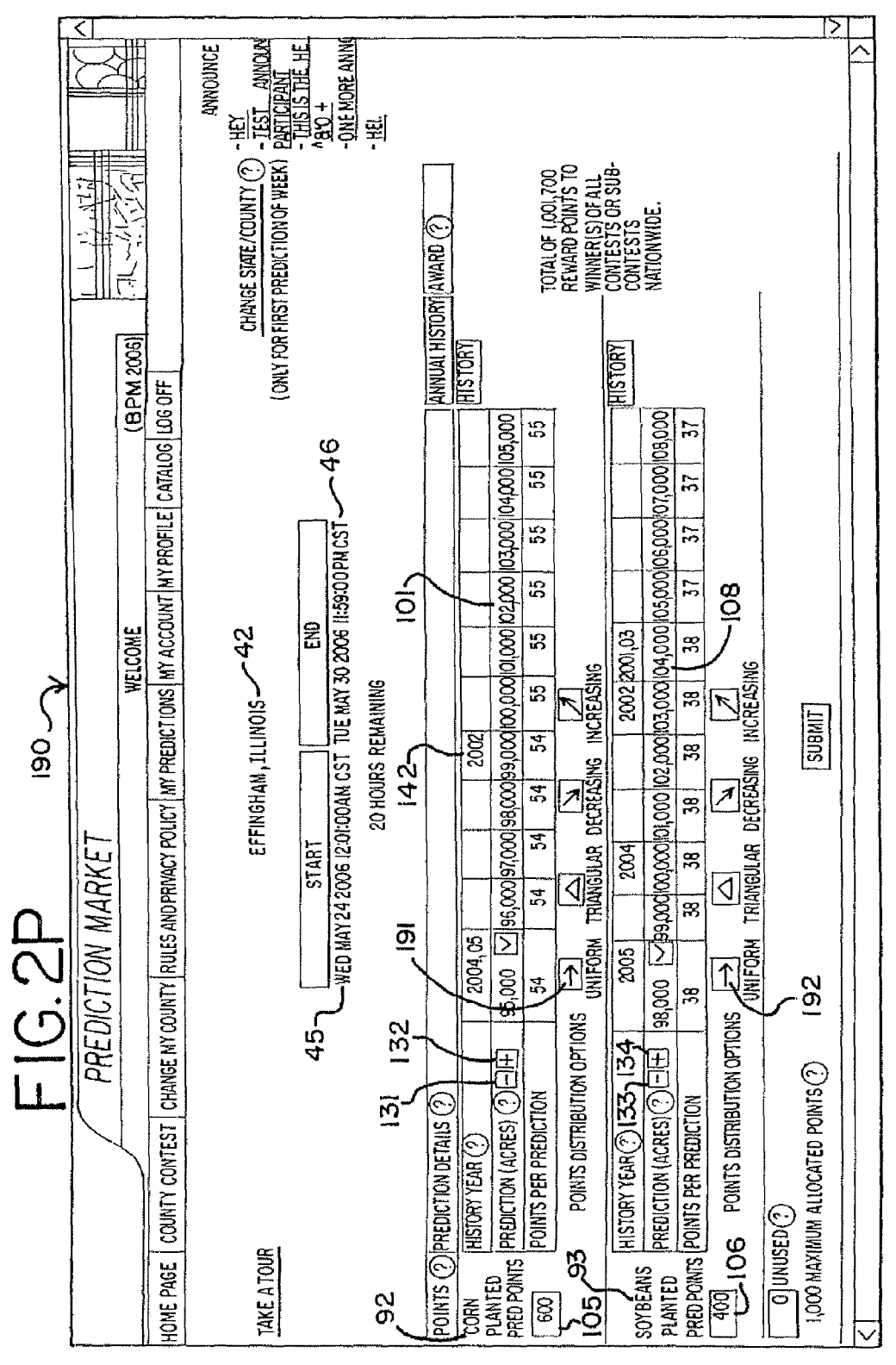

Screen 190 in FIG. 2P demonstrates the use of a uniform distribution option 191. When this distribution is selected, the points per estimation in the third row of grid 101 are allocated uniformly across the estimation range. Distributed points are rounded to the nearest full integer and the difference is adjusted towards the end of the range. Uniform distribution option 192 performs a similar point distribution in grid 108 of the soybean planting contest 93.

It will be apparent from the foregoing screens 160, 170, 180 and 190 in FIGS. 2M-2P that selection of the distribution options are independent. Any of the available distribution options 161, 171, 181 or 191 may be selected for the corn planting sub-contest 92 and, similarly, any of the available distribution options 162, 172, 182 or 192 may be selected for the soybean planting sub-contest 93.

Figure 2Q:
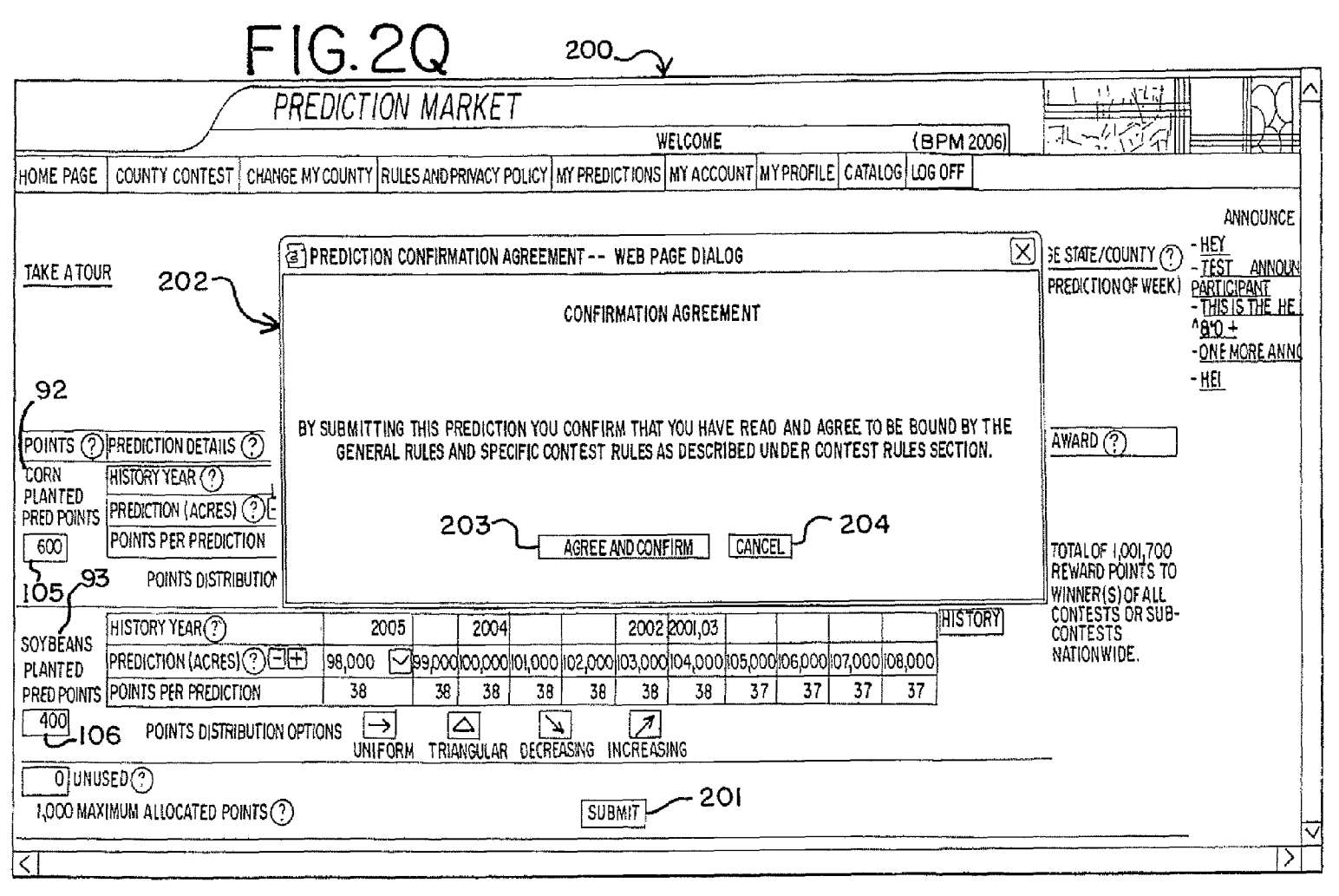

When the user has input the desired estimations in the second rows of grids 101 and 108 and has selected the desired distribution options for the points per estimation in the third row of grids 101 and 108, he/she may activate the Submit button 201 on screen 200 in FIG. 2Q. A pop-up window 202 may appear and it may request confirmation of the user's entries and/or confirmation that the submission is in accordance with the rules of the contest. If so, the user may activate the Agree and Confirm button 203. Otherwise, the user may cancel window 202 by activating the Cancel button 204.

Figure 2R:
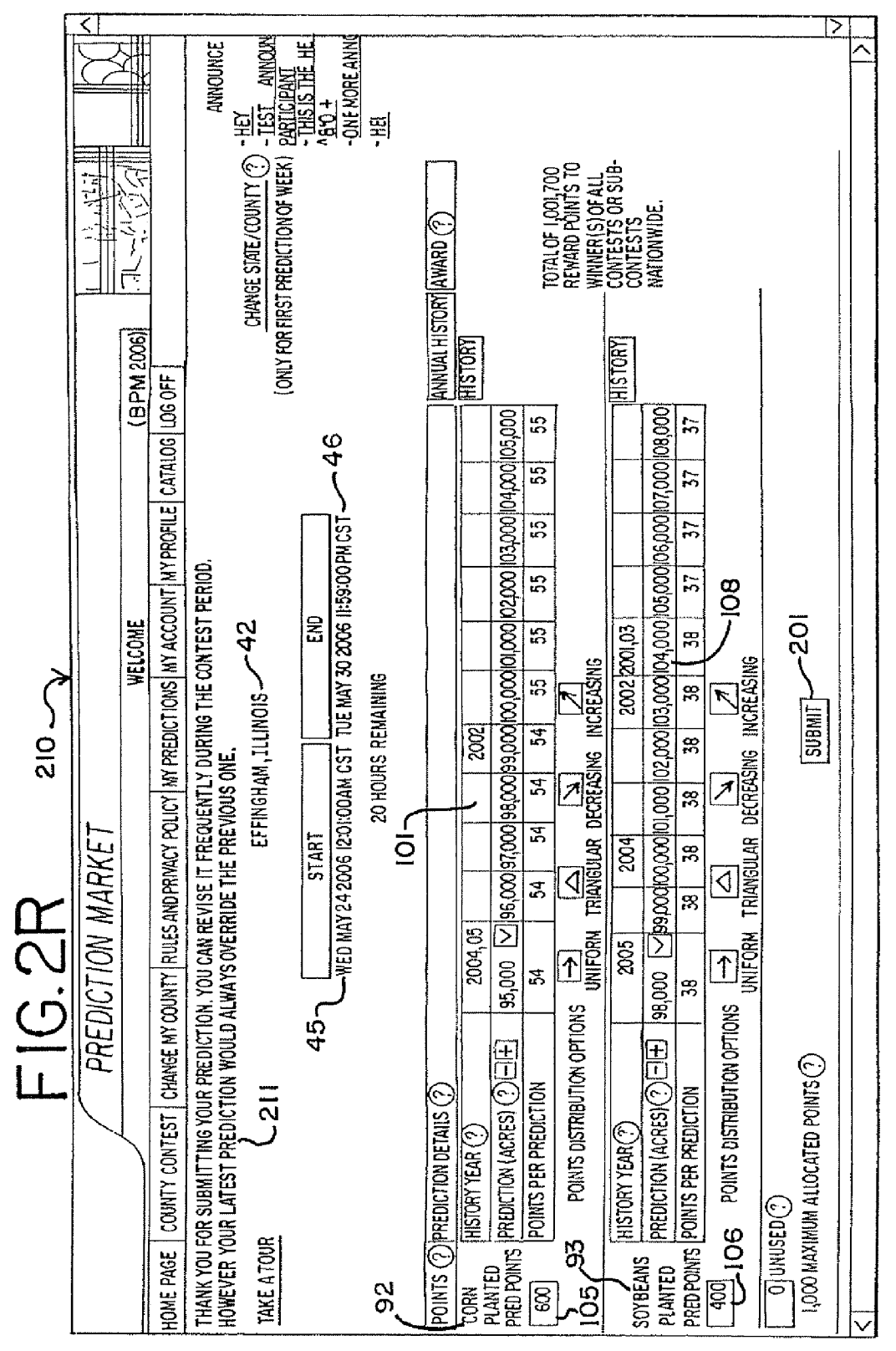

When the Confirm button 203 is activated, screen 210 in FIG. 2R may appear. At this time, all of the entries previously entered by the user are submitted to the system 20 in FIG. 1A or to the system 30 in FIG. 1B, including the number of estimation points for each of the sub-contests entered in fields 105 and 106, the estimations or data points entered in the second row of grids 101 and 108 and the points per estimation entered in the third row of grids 101 and 108. A message 211 may also appear on screen 210 thanking the user for submitting his/her estimations, advising that the user may revise estimations during the duration of the contest and advising that the latest estimations override earlier estimations. The County/State field 42 may change color, or the like, as an indication that the County/State cannot be changed during the current duration of this contest, which is provided at fields 45 and 46.

If the user again activates the Submit button 201, a screen 220 in FIG. 2S may appear. Screen 220 displays a message 221 advising that no changes have been made in the previously submitted estimations and that the prior estimations will not be submitted again. That is, the system 20 in FIG. 1A or the system 30 in FIG. 1B will not accept a newly submitted estimation that is identical to an earlier estimation.

The present invention encourages users to submit changed estimations since this provides greater data to the system 20 or 30. However, if a user submits a significant number of changed estimations within a predetermined time period, the user may be suspended. In the example of screen 230 in FIG. 2T, a message 231 advises the user that 26 estimations have been made in the last 3 hours. Message 231 advises that the user's account will be suspended if 30 estimations are submitted within a 3 hour period.

A user can monitor the number of points won in the contests, and the number of points redeemed towards prizes by clicking on the My Account tab 241 near the top of screen 240 in FIG. 2U. A record 242 will appear. Various fields in record 242 display the contest dates, the points played, the estimations, the cumulative points won, the cumulative points redeemed and the point balances.

If the user clicks on the My Predictions tab 251 in screen 250 in FIG. 2V, the history of the user's estimations will be displayed, such as in a record 252. The results displayed in record 252 may be filtered by selecting a sub-contest in field 253, by selecting a state in field 254, by selecting a county in field 255, or by selecting a date range in field 256. Without any filtering mode selected, the results displayed in record 252 may include the weeks of the contest, the contest starting date, the contest ending date, each sub-contest in which estimations were entered, the county and state, the estimation ranges entered, the points played in each sub-contest, and the date and time of each estimation. The listed sub-contests 257 and the show revisions 258 may contain hyperlinks.

Figure 2W:
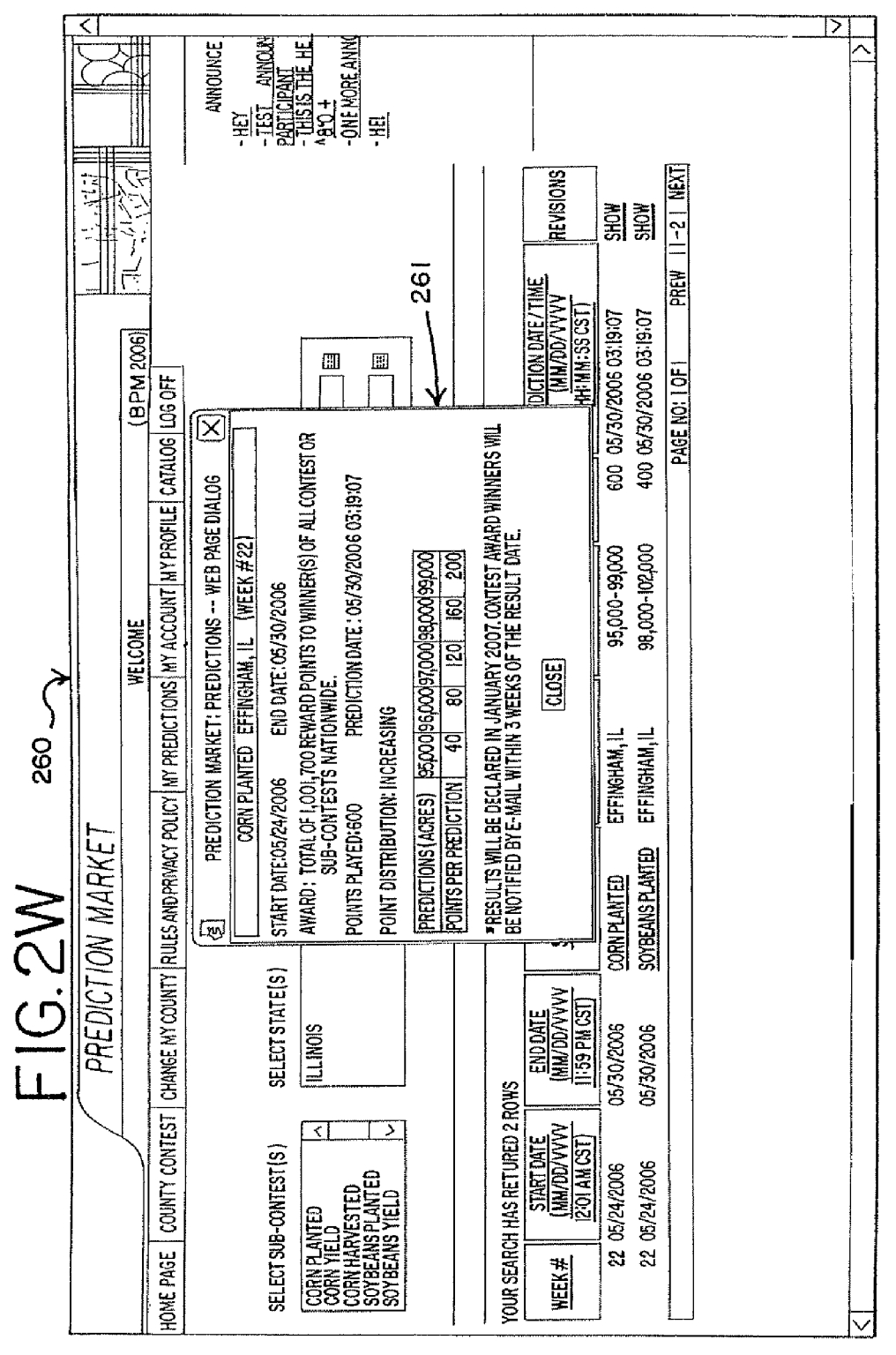

For example if one of the sub-contest hyperlinks 257 is clicked, a pop-up window 261 appears in screen 260 of FIG. 2W, which provides details on the last estimation made in the sub-contest and in the week associated with the hyperlink 257. In this instance, window 261 displays the details of the last estimation made for the corn planted sub-contest in week 22.

For example if one of the show revisions hyperlinks 258 in screen 250 of FIG. 2V is clicked, a pop-up window 271 appears in screen 270 of FIG. 2X, which provides details on all of the estimations and revisions made in the sub-contest and in the week associated with the hyperlink 258. In this instance, window 271 displays the details of the last estimation/revision at the top of the window made for the corn planted sub-contest in week 22. Additional hyperlinks 272 appear in window 271 for each of the sub-contests. Thus, the user can view the details of any estimation by clicking on the associated hyperlink 272 and viewing the details of the estimation in a manner already described for window 261 in FIG. 2W.

Figure 3A:
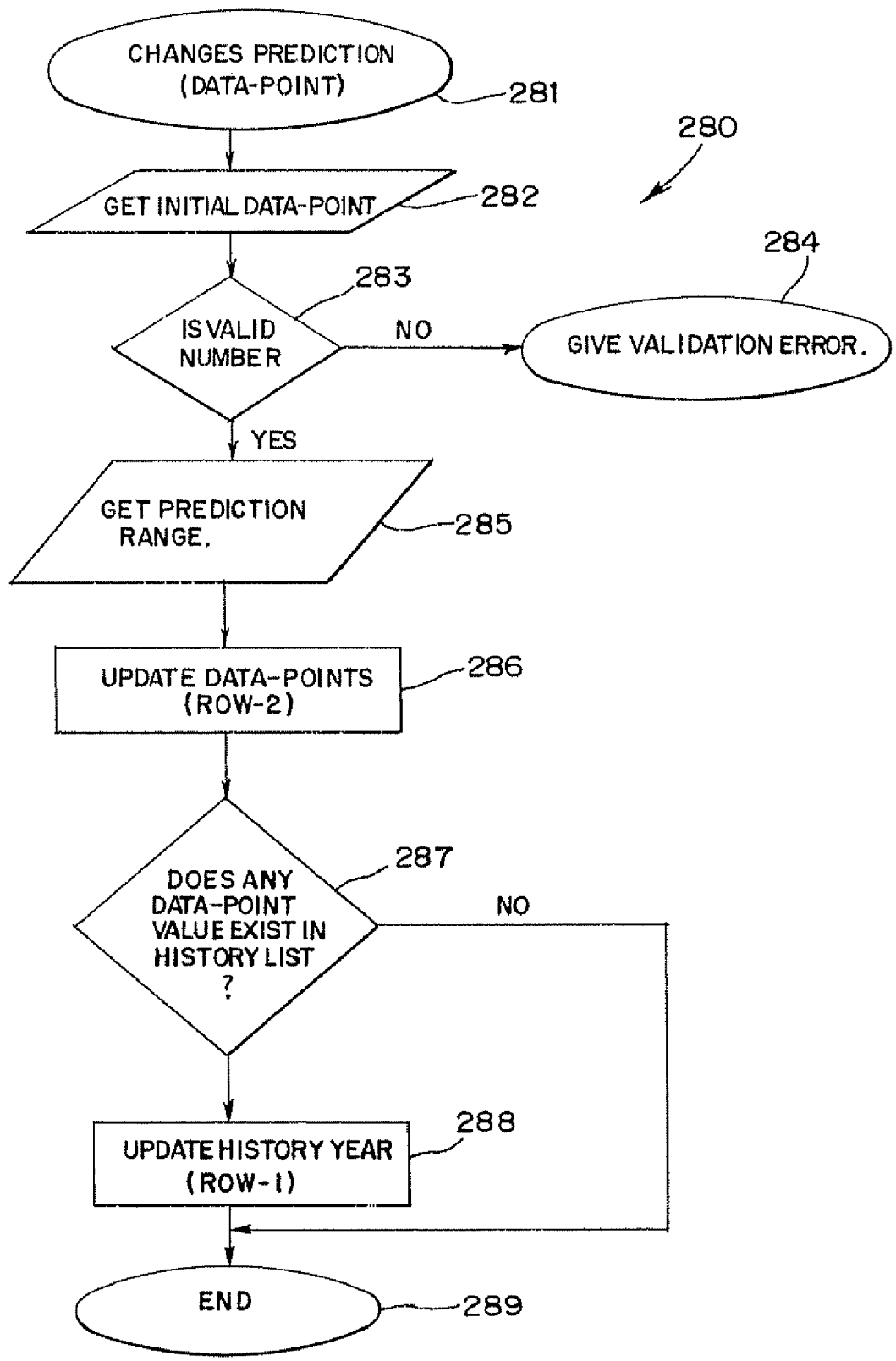

FIGS. 3A-3D are flow charts for certain steps utilized in some of the user interactive screens discussed above with respect to FIGS. 2A-2X. Flow chart FIG. 3A is concerned with the entry of the estimation or data points, sometimes also referred to as prediction points, in the second row of grids 101 and 108. For example in FIGS. 2K-2T, the data points are the number of acres estimated to be planted, which are entered into each of the spaces in the second row of grids 101 and 108. Each space or column in grids 101 and 108 represent a time period, such as one week. At bubble 281, the program is initialized for changes or entry of data points. At block 282, the user is permitted to make a data point entry into grid 101 or 108. Decision block 283 determines if the user entry is a valid number. If not, an error message is sent to the user at bubble 284. The data points or prediction range previously entered by this user is obtained, such as from database server 22 in FIG. 1A or 1B in block 285. This prediction range or set of data points is then updated with the newly entered data points in block 286. Decision block 287 then determines whether any of the data points is equal to that of a prior year in the available history. If so, at block 288, the first row in grids 101 or 108 is updated with any corresponding history year. The program then ends at bubble 289.

Flow chart 290 in FIG. 3B is concerned with the distribution of the points per estimate or per prediction in the third row of grids 101 and 108, as shown in FIGS. 2K-2T. At starting bubble 291, the program is initialized for the points distribution option. At block 292, the program gets the point distribution option selected by the user, such as triangular (peaked) 162 in FIG. 2M, decreasing 172 in FIG. 2N, increasing 182 in FIG. 2O, or uniform 192 in FIG. 2P. As previously discussed, if no distribution option is selected by the user, the uniform distribution 192 is used as the default distribution. At block 293, the points allocated in fields 108 or 106 for sub-contest 92 or 93 is determined. The prediction range or the number of data points in the spaces in the second row of grids 101 or 108 is determined in block 294. At block 295, the points per prediction in the third row are determined using the selected distribution option. The program then ends at bubble 296.

Flow chart 300 in FIG. 3C is concerned with the use of the + button 132 or 134 in FIGS. 2J and 2K for grids 101 or 108, respectively. The program associated with this flow chart is initiated at starting bubble 301 by clicking on the + button 132 or 134 in FIGS. 2J and 2K. At block 302, the existing prediction range or set of data points in the second row of grids 101 and 108 are obtained, the distribution option 162, 172, 182 or 192 is determined, and the points allocated in fields 105 and 106 for each sub-contest 92 and 93 are obtained. As previously discussed, for each click on + button 132 or 134, the data points are extended an additional space. Decision block 303 therefore determines if the maximum prediction range is reached, i.e., have all of the available spaces in the second row been filled with data points. If so, any additional clicks of the + button will cause an error message to be sent to the user at bubble 304. Otherwise, the data point range will be incremented by one tick at block 305. Block 306 then updates or reallocates the points per prediction or estimate in each space of the third row based upon the selected point distribution option 162, 172, 182 or 192 and the points allocated in field 105 or 106. Block 307 determines the new data points in the second row which correspond to data in the history table for prior years. If there is a match at block 308, the prior year is shown in the first row of grids 101 or 108. The program then ends at bubble 309.

Figure 3D:
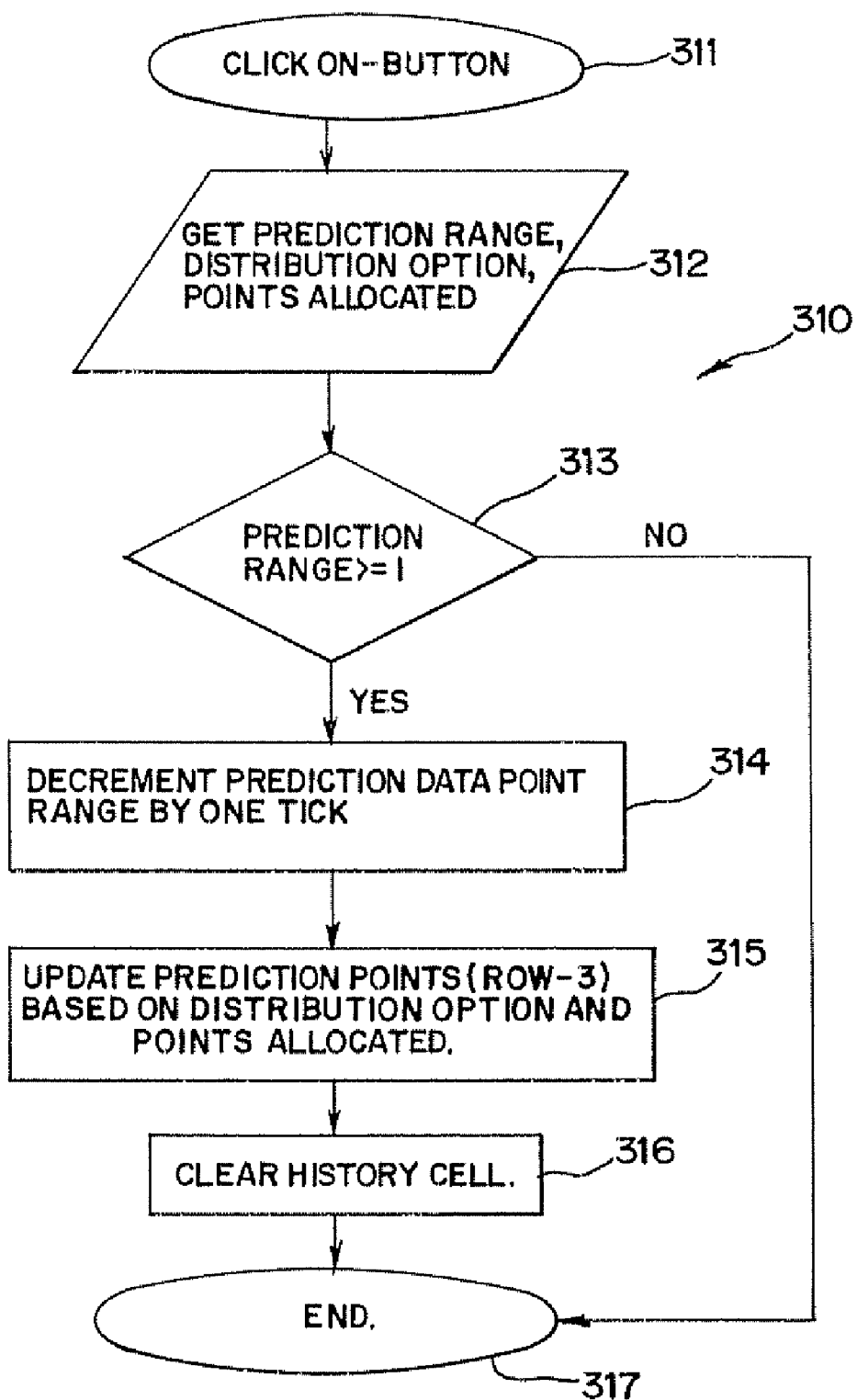

Flow chart 310 in FIG. 3D is concerned with the use of the – button 131 or 133 in FIGS. 2K and 2L for grids 101 or 108, respectively. The program associated with this flow chart is initiated at starting bubble 311 by clicking on the – button 131 or 133 in FIGS. 2K and 2L. At block 302, the existing prediction range or set of data points in the second row of grids 101 and 108 are obtained, the distribution option 162, 172, 182 or 192 is determined, and the points allocated in fields 105 and 106 for each sub-contest 92 and 93 are obtained. As previously discussed, for each click on – button 131 or 133, the number of data points is reduced or decremented by one space. Decision block 313 therefore determines if the prediction range greater than one space left in the second row with a data point. If so, any additional click of the – button will decrement the data points in the second row by one space or column, as shown at block 314. Block 315 then updates or reallocates the points per prediction or estimate in each space of the third row based upon the selected point distribution option 162, 172, 182 or 192 and the points allocated in field 105 or 106. Block 316 then clears any history in the first row of grids 101 and 108 for any data points that were deleted with the – button. The program then ends at bubble 317.

In summary, the present invention provides for continuous acquisition of information that is directly received from pre-screened and qualified participants who are involved in the subject matter of the contests. The present invention enables the participants to make multiple estimates over a period of time, and to express levels of confidence in their estimates through allocation of points between sub-contests and through distribution of points per estimate. This provides a rich data stream of information for analysis, such as for trends, patterns, divergence, convergence and the like. In particular, analysis of the information acquired with the present invention can be useful in predicting changes in supply, changes in price, and the like, at an early time before such trends and the like become apparent to other persons. Data processing centers may also import other information into the analysis of the information acquired with the present invention, such as economic movements or cycles, market volatility and changing weather conditions.

While particular embodiments of the invention have been shown and described, it will be obvious to those skilled in the art that changes and modifications may be made therein without departing from the invention in its broader aspects.

The invention claimed is:

1. A system for obtaining estimations relating to agricultural crops from a plurality of participants in a contest, said system comprising:
   a data processor for generating a user interactive screen and for communicating the user interactive screen to a plurality of participants in the contest; and the user interactive screen containing a contest grid, said grid containing a plurality of fields for entering a plurality of estimations by a plurality of participants relating to at least one event concerning different types of agricultural crops, wherein price is not a factor in the plurality of estimations;
   a database associated with the data processor for receiving and storing the plurality of estimations entered by each participant; and
   said data processor also analyzing the plurality of estimations stored in the database to determine trends or forecasts relating to at least one of the different types of agricultural crops.

2. The system for obtaining estimations relating to agricultural crops in a contest in accordance with claim 1, said user interactive screen including a sub-contest grid for each of a plurality of sub-contests relating to a plurality of different agricultural crop events.

3. The system for obtaining estimations relating to agricultural crops in a contest in accordance with claim 2, wherein the sub-contests are selected from a group of agricultural crop events consisting of corn planted, soybeans planted, wheat planted, corn harvested, soybeans harvested, and wheat harvested.

4. The system for obtaining estimations relating to agricultural crops in a contest in accordance with claim 2, said user interactive screen including a sub-contest grid for each sub-contest, said grid containing a third plurality of fields for entering a points per estimations for each estimation in the second plurality of fields.

5. The system for obtaining estimations relating to agricultural crops in a contest in accordance with claim 4, said user interactive screen including a second row in each sub-contest grid, said second row containing said second plurality of fields for entering the plurality of estimations in the second row.

6. The system for obtaining estimations relating to agricultural crops in a contest in accordance with claim 5, said user interactive screen including a third row in each sub-contest grid, said third row containing said third plurality of fields for entering the points per estimation for each of the plurality of estimations in the second row.

7. The system for obtaining estimations relating to agricultural crops in a contest in accordance with claim 6, said user interactive screen including a first row consisting of a first plurality of fields in each sub-contest grid for displaying estimations from a prior year in the event that one of the plurality of estimations in the second row matches historical data from a prior year.

8. The system for obtaining estimations relating to agricultural crops in a contest in accordance with claim 5, said user interactive screen including a fixed number of points per contest; and further including a field for each sub-contest in which the fixed number of points per contest may be partially or entirely allocated between the sub-contests.

9. The system for obtaining estimations relating to agricultural crops in a contest in accordance with claim 6, said user interactive screen including a field for selection of a state and county for the contest.

10. The system for obtaining estimations relating to agricultural crops in a contest in accordance with claim 6, said user interactive screen permitting the user to change his/her estimations, the points per estimations or the points per sub-contest during a period of time while the contest is active.

11. The system for obtaining estimations relating to agricultural crops in a contest in accordance with claim 6, said user interactive screen including a points per distribution option that, when selected by the participant, automatically changes the distribution of the points per estimations in the third row of the contest grid.

12. The system for obtaining estimations relating to agricultural crops in a contest in accordance with claim 4, said user interactive screen including the points per distribution option which is selected from a group consisting of a uniform distribution, a triangular distribution, an increasing distribution or a decreasing distribution.

13. A user interactive screen generated by a data processing, system said, system including a database, for estimating a future event relating to agricultural crops, said user interactive screen comprising:
   a contest grid, said grid containing a plurality of fields for entering a plurality of estimations by a plurality of participants relating to at least one event concerning different types of agricultural crops, wherein price is not a factor in the plurality of estimations;
   the user interactive screen limiting each of the plurality of participants to a fixed number of points which may be allocated between the different types of agricultural crops;
   wherein the fixed number of points for the plurality of estimations are stored in the database and the fixed number of points for the plurality of estimations are analyzed at a future time to determine which of the plurality of participants entered a plurality of estimations which most closely approximates an agricultural crop event.

14. The user interactive screen in accordance with claim 13, said user interactive screen further comprising:
   a contest grid for each of a plurality of sub-contests relating to a plurality of different agricultural crop events.

15. The user interactive screen in accordance with claim 14, said plurality of sub-contests selected from a group of agricultural crop events consisting of corn planted, soybeans planted, wheat planted, corn harvested, soybeans harvested, and wheat harvested.

16. The user interactive screen in accordance with claim 14, said contest grid for each sub-contest including a third plurality of fields for entering a points per estimation for each estimation in the second plurality of fields.

17. The user interactive screen in accordance with claim 14, said contest grid having a second row, said second row containing said second plurality of fields for entering the plurality of estimations in the second row.

18. The user interactive screen in accordance with claim 17, said contest grid having a third row, said third row containing said third plurality of fields for entering the points per estimation for each estimation in the second row.

19. The user interactive screen in accordance with claim 18, said contest grid having a first row consisting of a plurality of fields, said first row for displaying estimations entered in a prior year in the event that one of the plurality of estimations in the second row matches historical data from a prior year.

20. The user interactive screen in accordance with claim 14, said user interactive screen further comprising:
   a plurality of points per contest; and
   a field for each sub-contest in which the plurality of points per contest may be partially or entirely allocated between the sub-contests.

21. The user interactive screen in accordance with claim 14, said user interactive screen further comprising:
   a field for selection of a state and county for the contest.

22. The user interactive screen in accordance with claim 18, said user interactive screen further comprising:
   a points per distribution option that, when selected by the participant, automatically changes the distribution of the points per estimation in the third row of the contest grid.

23. The user interactive screen in accordance with claim 22, said points per distribution option selectable from group of options consisting of a uniform distribution, a triangular distribution, an increasing distribution or a decreasing distribution.

* * * * *